US012639570B2

(12) United States Patent
Tan et al.

(10) Patent No.: US 12,639,570 B2
(45) Date of Patent: May 26, 2026

(54) DEEP LEARNING IMAGE ANALYSIS WITH INCREASED MODULARITY AND REDUCED FOOTPRINT

(71) Applicant: GE Precision Healthcare LLC, Wauwatosa, WI (US)

(72) Inventors: Tao Tan, Eindhoven (NL); Hongxu Yang, Utrecht (NL); Gopal Biligeri Avinash, Concord, CA (US); Balázs Péter Cziria, Budapest (HU); Pál Tegzes, Budapest (HU); Xiaomeng Dong, San Ramon, CA (US); Ravi Soni, Livermore, CA (US); Lehel Mihály Ferenczi, Budapest (HU); Laszlo Rusko, Budapest (HU)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 806 days.

(21) Appl. No.: 18/046,347

(22) Filed: Oct. 13, 2022

(65) Prior Publication Data

US 2024/0127047 A1    Apr. 18, 2024

(51) Int. Cl.
*G06N 3/08* (2023.01)
*G06N 3/045* (2023.01)

(52) U.S. Cl.
CPC .............. *G06N 3/08* (2013.01); *G06N 3/045* (2023.01)

(58) Field of Classification Search
CPC .................................. G06N 3/08; G06N 3/045
See application file for complete search history.

(56) References Cited

U.S. PATENT DOCUMENTS

| | | | |
|---|---|---|---|
| 10,089,576 B2 | 10/2018 | Gao et al. | |
| 10,891,731 B2 * | 1/2021 | Brestel ................... | G06F 18/24 |
| 2020/0089755 A1 | 3/2020 | Shazeer et al. | |
| 2020/0193244 A1 | 6/2020 | Zhou et al. | |
| 2020/0258235 A1 | 8/2020 | Lu | |
| 2021/0005307 A1 | 1/2021 | Knoplioch et al. | |
| 2021/0264274 A1 * | 8/2021 | Kellerman ............ | G06N 3/084 |
| 2021/0397954 A1 | 12/2021 | Yoshihama | |

(Continued)

FOREIGN PATENT DOCUMENTS

EP            4 006 790 A1     6/2022

OTHER PUBLICATIONS

International Search Report and Written Opinion received for PCT Application Serial No. PCT/US2023/030746 dated Dec. 12, 2023, 9 pages.

(Continued)

*Primary Examiner* — Kenneth B Lee, Jr.
(74) *Attorney, Agent, or Firm* — Amin, Turocy & Watson, LLP

(57) ABSTRACT

Systems/techniques that facilitate deep learning image analysis with increased modularity and reduced footprint are provided. In various embodiments, a system can access medical imaging data. In various aspects, the system can perform, via execution of a deep learning neural network, a plurality of inferencing tasks on the medical imaging data. In various instances, the deep learning neural network can comprise a common backbone in parallel with a plurality of task-specific backbones. In various cases, the plurality of task-specific backbones can respectively correspond to the plurality of inferencing tasks.

20 Claims, 17 Drawing Sheets

(56) References Cited

U.S. PATENT DOCUMENTS

| | | | |
|---|---|---|---|
| 2022/0358749 A1* | 11/2022 | Yonetani ................. | G06N 3/08 |
| 2022/0414832 A1* | 12/2022 | Hu ........................... | A61B 6/42 |
| 2023/0089026 A1* | 3/2023 | Tran ........................ | A61B 6/48 |
| | | | 705/2 |

OTHER PUBLICATIONS

Reed, S. et al. | "A Generalist Agent." arXiv:2205.06175v2 [cs.AI] May 19, 2022, 40 pages.
Mullapudi, R.T. et al. | "HydraNets: Specialized Dynamic Architectures for Efficient Inference." Article from https://openaccess.thecvf.com/content_cvpr_2018/papers/Mullapudi_HydraNets_Specialized_Dynamic_CVPR_2018_paper.pdf, 2018, 10 pages.

* cited by examiner

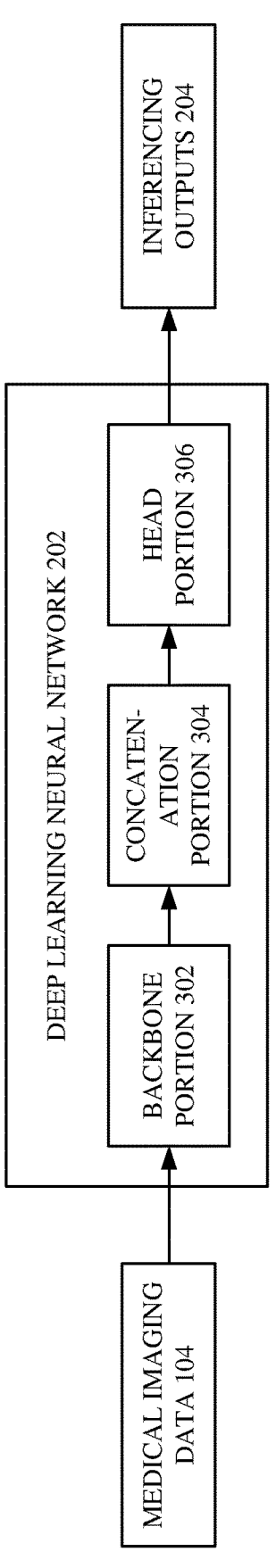
FIG. 3

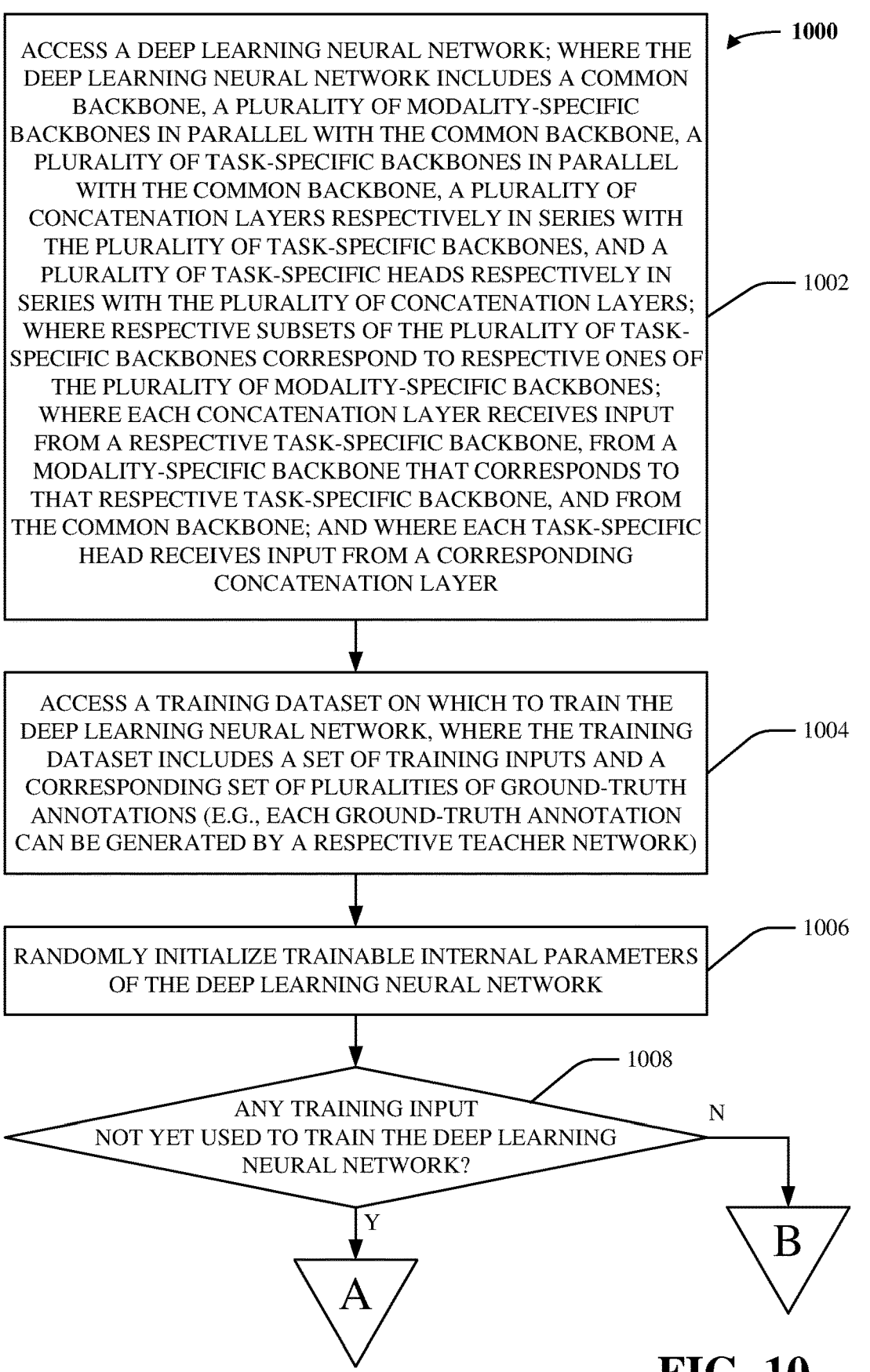

1000

ACCESS A DEEP LEARNING NEURAL NETWORK; WHERE THE DEEP LEARNING NEURAL NETWORK INCLUDES A COMMON BACKBONE, A PLURALITY OF MODALITY-SPECIFIC BACKBONES IN PARALLEL WITH THE COMMON BACKBONE, A PLURALITY OF TASK-SPECIFIC BACKBONES IN PARALLEL WITH THE COMMON BACKBONE, A PLURALITY OF CONCATENATION LAYERS RESPECTIVELY IN SERIES WITH THE PLURALITY OF TASK-SPECIFIC BACKBONES, AND A PLURALITY OF TASK-SPECIFIC HEADS RESPECTIVELY IN SERIES WITH THE PLURALITY OF CONCATENATION LAYERS; WHERE RESPECTIVE SUBSETS OF THE PLURALITY OF TASK-SPECIFIC BACKBONES CORRESPOND TO RESPECTIVE ONES OF THE PLURALITY OF MODALITY-SPECIFIC BACKBONES; WHERE EACH CONCATENATION LAYER RECEIVES INPUT FROM A RESPECTIVE TASK-SPECIFIC BACKBONE, FROM A MODALITY-SPECIFIC BACKBONE THAT CORRESPONDS TO THAT RESPECTIVE TASK-SPECIFIC BACKBONE, AND FROM THE COMMON BACKBONE; AND WHERE EACH TASK-SPECIFIC HEAD RECEIVES INPUT FROM A CORRESPONDING CONCATENATION LAYER

1002

ACCESS A TRAINING DATASET ON WHICH TO TRAIN THE DEEP LEARNING NEURAL NETWORK, WHERE THE TRAINING DATASET INCLUDES A SET OF TRAINING INPUTS AND A CORRESPONDING SET OF PLURALITIES OF GROUND-TRUTH ANNOTATIONS (E.G., EACH GROUND-TRUTH ANNOTATION CAN BE GENERATED BY A RESPECTIVE TEACHER NETWORK)

1004

RANDOMLY INITIALIZE TRAINABLE INTERNAL PARAMETERS OF THE DEEP LEARNING NEURAL NETWORK

1006

1008

ANY TRAINING INPUT NOT YET USED TO TRAIN THE DEEP LEARNING NEURAL NETWORK?

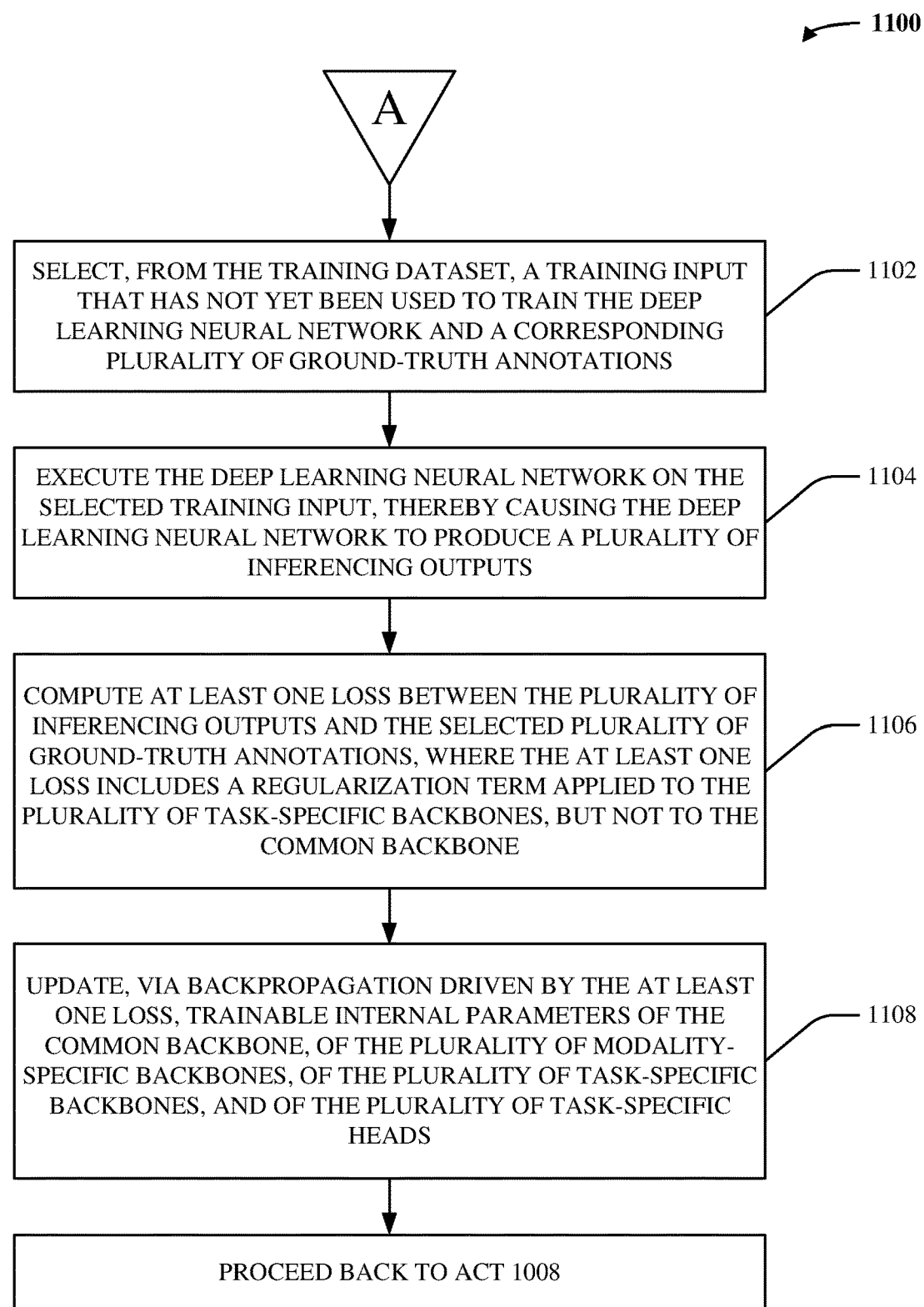

SELECT, FROM THE TRAINING DATASET, A TRAINING INPUT THAT HAS NOT YET BEEN USED TO TRAIN THE DEEP LEARNING NEURAL NETWORK AND A CORRESPONDING PLURALITY OF GROUND-TRUTH ANNOTATIONS — 1102

EXECUTE THE DEEP LEARNING NEURAL NETWORK ON THE SELECTED TRAINING INPUT, THEREBY CAUSING THE DEEP LEARNING NEURAL NETWORK TO PRODUCE A PLURALITY OF INFERENCING OUTPUTS — 1104

COMPUTE AT LEAST ONE LOSS BETWEEN THE PLURALITY OF INFERENCING OUTPUTS AND THE SELECTED PLURALITY OF GROUND-TRUTH ANNOTATIONS, WHERE THE AT LEAST ONE LOSS INCLUDES A REGULARIZATION TERM APPLIED TO THE PLURALITY OF TASK-SPECIFIC BACKBONES, BUT NOT TO THE COMMON BACKBONE — 1106

UPDATE, VIA BACKPROPAGATION DRIVEN BY THE AT LEAST ONE LOSS, TRAINABLE INTERNAL PARAMETERS OF THE COMMON BACKBONE, OF THE PLURALITY OF MODALITY-SPECIFIC BACKBONES, OF THE PLURALITY OF TASK-SPECIFIC BACKBONES, AND OF THE PLURALITY OF TASK-SPECIFIC HEADS — 1108

PROCEED BACK TO ACT 1008

FIG. 11

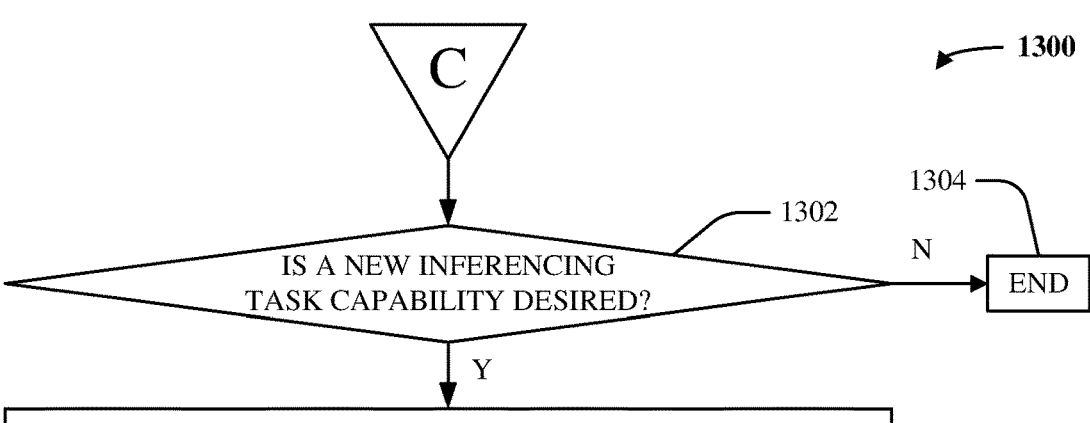

1300

C

IS A NEW INFERENCING
TASK CAPABILITY DESIRED? — 1302

1304

N

END — 1304

Y

INSERT INTO THE PLURALITY OF TASK-SPECIFIC BACKBONES
A NEW TASK-SPECIFIC BACKBONE CORRESPONDING TO THE
NEW INFERENCING TASK CAPABILITY, INSERT INTO THE
PLURALITY OF CONCATENATION LAYERS A NEW
CONCATENATION LAYER IN SERIES WITH THE NEW TASK-
SPECIFIC BACKBONE, AND INSERT INTO THE PLURALITY OF
TASK-SPECIFIC HEADS A NEW TASK-SPECIFIC HEAD IN
SERIES WITH THE NEW CONCATENATION LAYER  (E.G., THE
NEW TASK-SPECIFIC BACKBONE CAN CORRESPOND TO ONE
OF THE PLURALITY OF MODALITY-SPECIFIC BACKBONES;
THE NEW CONCATENATION LAYER CAN RECEIVE INPUT
FROM THE NEW TASK-SPECIFIC BACKBONE, FROM
WHICHEVER MODALITY-SPECIFIC BACKBONE CORRESPONDS
TO THE NEW TASK-SPECIFIC BACKBONE, AND FROM THE
COMMON BACKBONE; AND THE NEW TASK-SPECIFIC HEAD
CAN RECEIVE INPUT FROM THE NEW CONCATENATION
LAYER) — 1306

INSERT, INTO EACH PLURALITY OF GROUND-TRUTH
ANNOTATIONS IN THE TRAINING DATASET, A NEW GROUND-
TRUTH ANNOTATION CORRESPONDING TO THE NEW
INFERENCING TASK CAPABILITY (E.G., CAN BE GENERATED
BY A NEW TEACHER NETWORK) — 1308

RANDOMLY INITIALIZE TRAINABLE INTERNAL PARAMETERS
OF THE NEW TASK-SPECIFIC BACKBONE AND OF THE NEW
TASK-SPECIFIC HEAD, WHILE LEAVING ALL OTHER
TRAINABLE PARAMETERS OF THE DEEP LEARNING NEURAL
NETWORK UNCHANGED — 1310

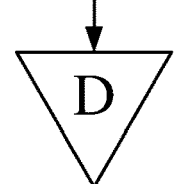

Figure 14:
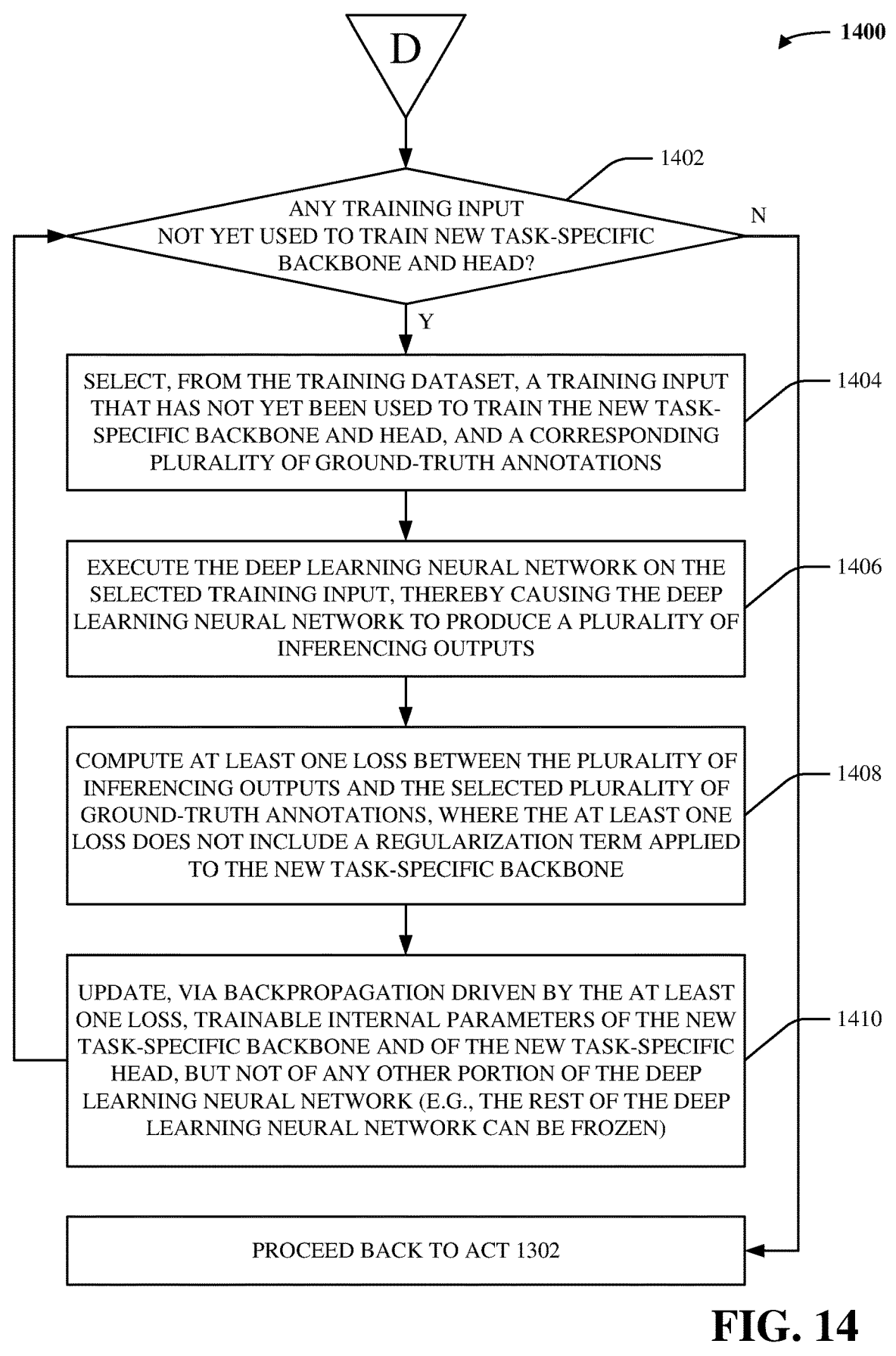

ANY TRAINING INPUT NOT YET USED TO TRAIN NEW TASK-SPECIFIC BACKBONE AND HEAD? — 1402

N

Y

SELECT, FROM THE TRAINING DATASET, A TRAINING INPUT THAT HAS NOT YET BEEN USED TO TRAIN THE NEW TASK-SPECIFIC BACKBONE AND HEAD, AND A CORRESPONDING PLURALITY OF GROUND-TRUTH ANNOTATIONS — 1404

EXECUTE THE DEEP LEARNING NEURAL NETWORK ON THE SELECTED TRAINING INPUT, THEREBY CAUSING THE DEEP LEARNING NEURAL NETWORK TO PRODUCE A PLURALITY OF INFERENCING OUTPUTS — 1406

COMPUTE AT LEAST ONE LOSS BETWEEN THE PLURALITY OF INFERENCING OUTPUTS AND THE SELECTED PLURALITY OF GROUND-TRUTH ANNOTATIONS, WHERE THE AT LEAST ONE LOSS DOES NOT INCLUDE A REGULARIZATION TERM APPLIED TO THE NEW TASK-SPECIFIC BACKBONE — 1408

UPDATE, VIA BACKPROPAGATION DRIVEN BY THE AT LEAST ONE LOSS, TRAINABLE INTERNAL PARAMETERS OF THE NEW TASK-SPECIFIC BACKBONE AND OF THE NEW TASK-SPECIFIC HEAD, BUT NOT OF ANY OTHER PORTION OF THE DEEP LEARNING NEURAL NETWORK (E.G., THE REST OF THE DEEP LEARNING NEURAL NETWORK CAN BE FROZEN) — 1410

PROCEED BACK TO ACT 1302

Figure 15:
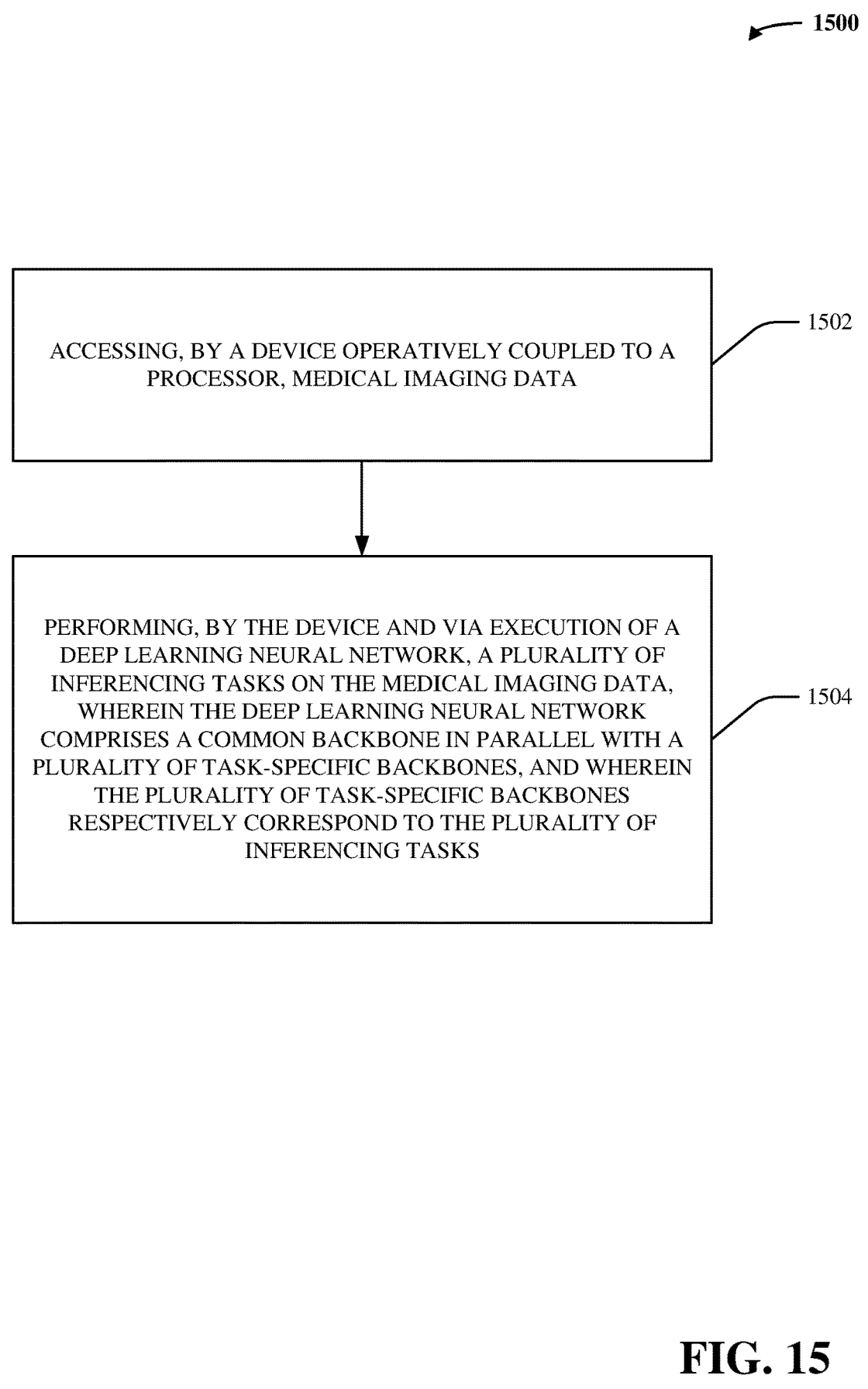

ACCESSING, BY A DEVICE OPERATIVELY COUPLED TO A
PROCESSOR, MEDICAL IMAGING DATA

1502

PERFORMING, BY THE DEVICE AND VIA EXECUTION OF A
DEEP LEARNING NEURAL NETWORK, A PLURALITY OF
INFERENCING TASKS ON THE MEDICAL IMAGING DATA,
WHEREIN THE DEEP LEARNING NEURAL NETWORK
COMPRISES A COMMON BACKBONE IN PARALLEL WITH A
PLURALITY OF TASK-SPECIFIC BACKBONES, AND WHEREIN
THE PLURALITY OF TASK-SPECIFIC BACKBONES
RESPECTIVELY CORRESPOND TO THE PLURALITY OF
INFERENCING TASKS

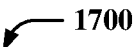
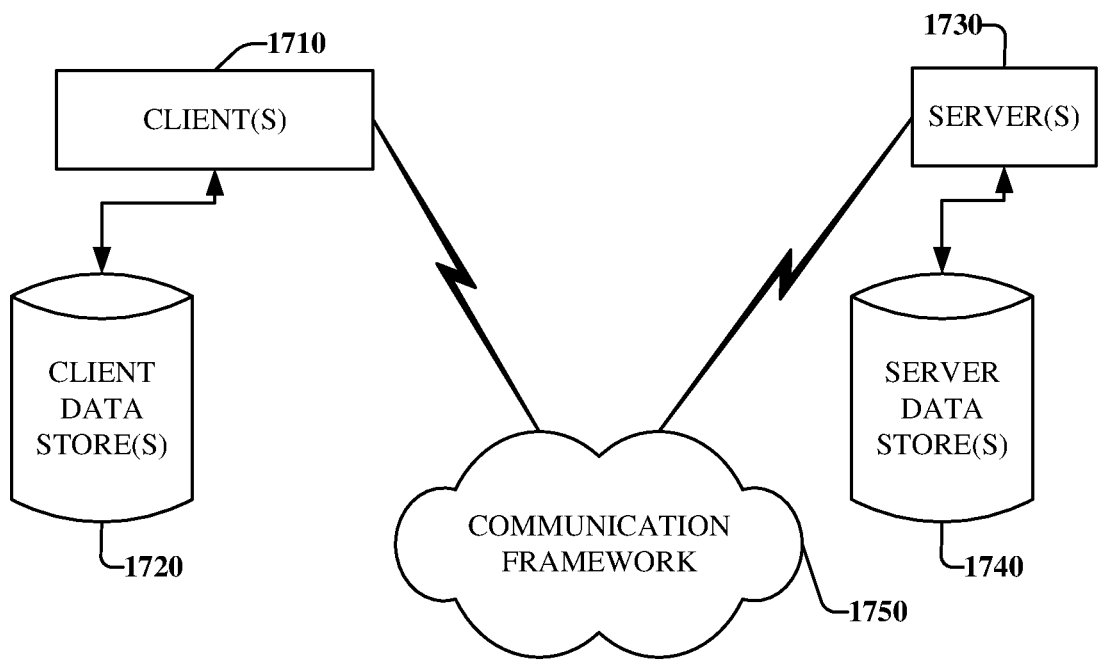
FIG. 17

DEEP LEARNING IMAGE ANALYSIS WITH INCREASED MODULARITY AND REDUCED FOOTPRINT

TECHNICAL FIELD

The subject disclosure relates generally to deep learning, and more specifically to deep learning image analysis with increased modularity and reduced footprint.

BACKGROUND

A deep learning neural network can be trained to perform an inferencing task on a medical image. Unfortunately, deep learning neural networks that achieve high performance often consume excessive amounts of computational resources.

Accordingly, systems or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate deep learning image analysis with increased modularity and reduced footprint are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access medical imaging data. In various aspects, the computer-executable components can further comprise an inference component that can perform, via execution of a deep learning neural network, a plurality of inferencing tasks on the medical imaging data. In various instances, the deep learning neural network can comprise a common backbone in parallel with a plurality of task-specific backbones. In various cases, the plurality of task-specific backbones can respectively correspond to the plurality of inferencing tasks.

According to one or more embodiments, the above-described system can be implemented as a computer-implemented method or a computer program product.

DESCRIPTION OF THE DRAWINGS

FIG. 3 illustrates an example, non-limiting block diagram showing how a deep learning neural network can include a backbone portion, a concatenation portion, and a head portion in accordance with one or more embodiments described herein.

FIGS. 10-14 illustrate flow diagrams of example, non-limiting computer-implemented methods for training a deep learning neural network in accordance with one or more embodiments described herein.

FIG. 15 illustrates a flow diagram of an example, non-limiting computer-implemented method that facilitates deep learning image analysis with increased modularity and reduced footprint in accordance with one or more embodiments described herein.

FIG. 17 illustrates an example networking environment operable to execute various implementations described herein.

DETAILED DESCRIPTION

Figure 1:
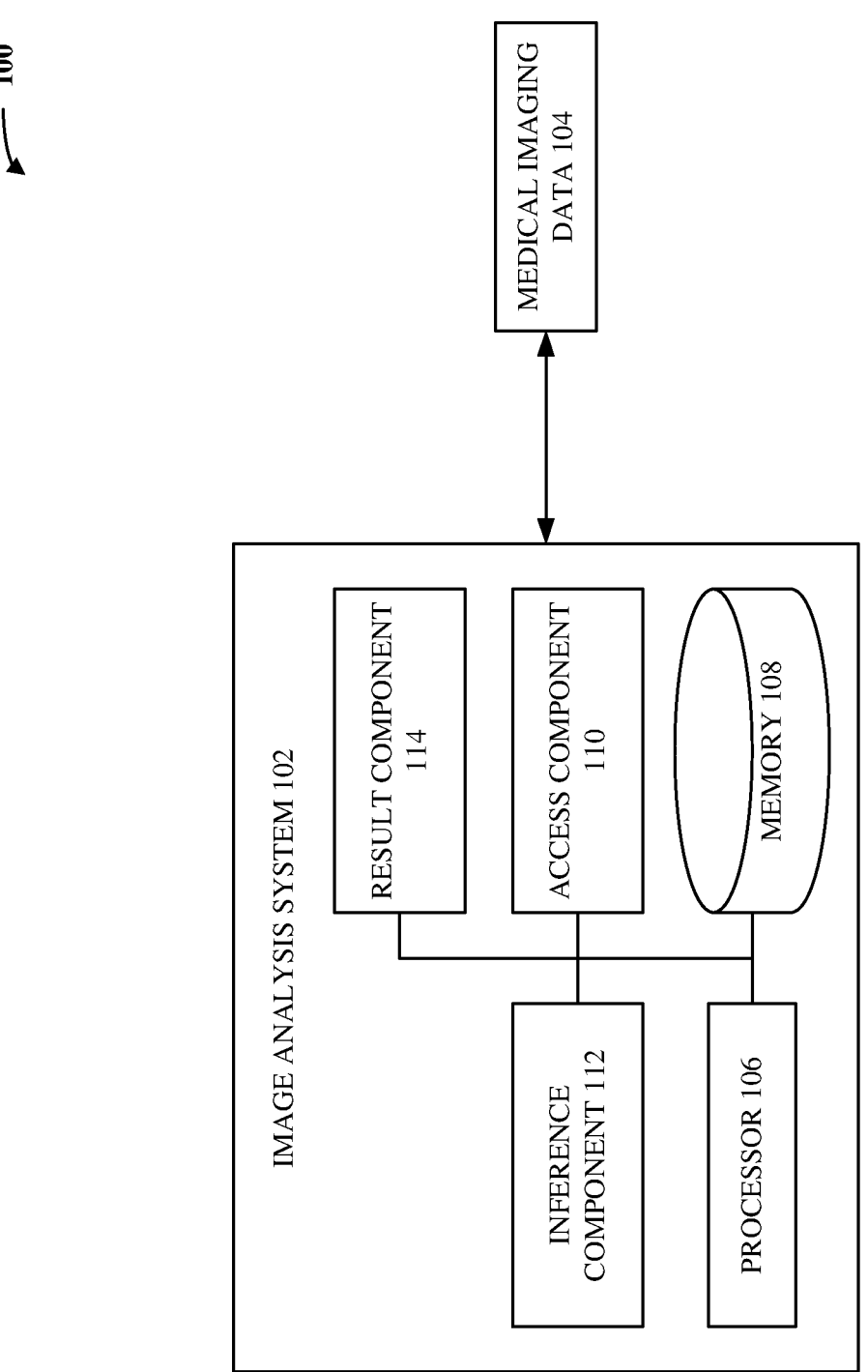
FIG. 1 illustrates a block diagram of an example, non-limiting system that facilitates deep learning image analysis with increased modularity and reduced footprint in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A deep learning neural network can be trained (e.g., via supervised training, unsupervised training, reinforcement learning) to perform an inferencing task (e.g., image quality enhancement, image denoising, image kernel transformation, image segmentation, image classification) on medical images (e.g., scanned/reconstructed images generated by a computed tomography (CT) scanner, scanned/reconstructed images generated by a magnetic resonance imaging (MRI) scanner, scanned/reconstructed images generated by a positron emission tomography (PET) scanner, scanned/reconstructed images generated by an X-ray scanner, scanned/reconstructed images generated by an ultrasound scanner).

Unfortunately, deep learning neural networks that achieve high performance often consume large amounts of computational resources. For example, a deep learning neural network that has achieved a high degree of accuracy for performing a given inferencing task can consume large amounts of time when performing such given inferencing task on any given medical image (e.g., can consume dozens of milliseconds of inferencing time). As another example, a deep learning neural network that has achieved a high degree of accuracy for performing a given inferencing task can have tens of millions of internal parameters, and electronic storage or execution of such tens of millions of internal parameters can consume large amounts of computer memory or processing capacity (e.g., random access memory (RAM) capacity, graphics processing unit (GPU) capacity).

Such heightened consumption of computational resources can be compounded in operational contexts in which multiple, different inferencing tasks (e.g., pneumothorax classification or segmentation, endotracheal tube localization, brightness-contract enhancement) are desired to be performed on any given medical image. In particular, for each of such multiple, different inferencing tasks, a distinct or unique deep learning neural network can be trained to perform such inferencing task on inputted medical images. This can yield multiple, different deep learning neural networks, each capable of performing a respective one of the multiple, different inferencing tasks. Accordingly, when a medical image is obtained, each of such multiple, different deep learning neural networks can be executed on the medical image, so as to collectively perform the multiple, different inferencing tasks on the medical image. Unfortunately, because storing or executing a single deep learning neural network can already consume large amounts of inferencing time or computer memory, storing or executing such multiple, different deep learning neural networks can consume vastly greater amounts of inferencing time or computer memory.

Some existing techniques attempt to address these issues by training a single deep learning neural network to perform all of such multiple, different inferencing tasks at once. However, in such existing techniques, the single deep learning neural network often implements a fully-connected internal architecture. As the inventors of various embodiments described herein recognized, such fully-connected internal architecture can be disadvantageous. In particular, the present inventors realized that such fully-connected internal architecture can globally average (e.g., globally reduce) the performance of the single deep learning neural network across such multiple, different inferencing tasks. In other words, the single deep learning neural network can perform each of such multiple, different inferencing tasks better than terribly but worse than well. Furthermore, the present inventors realized that such fully-connected internal architecture can be considered as a black-box that obscurely intertwines the multiple, different inferencing tasks with one another, which can unnecessarily complicate subsequent retraining or revalidation of the single deep learning neural network. For example, suppose that the single deep learning neural network has achieved sufficient accuracy (e.g., as specified by applicable or governing regulatory restrictions) for all but a small minority of the multiple, different inferencing tasks. In such case, because the fully-connected internal architecture can obscure which internal parameters of the single deep learning neural network influence which inferencing tasks in which ways, the entirety of the single deep learning neural network can have to undergo additional training or validation, notwithstanding that the single deep learning neural network can already perform the vast majority of the multiple, different inferencing tasks with sufficient accuracy. In other words, additional time and resources can be wasted retraining the single deep learning neural network to perform those inferencing tasks that it already performs sufficiently well.

Thus, when various existing techniques are implemented, deep learning neural networks can have excessively large footprints (e.g., can consume excessively large amounts of computing resources) and can lack modularity (e.g., a fully-connected internal architecture can be considered as a black-box, and can thus require full retraining or revalidation even when it performs a vast majority of its inferencing tasks sufficiently accurately). Such deep learning neural networks can be disadvantageous, particularly when deployed via resource-constrained computing devices (e.g., medical diagnostic devices, smart phones, autonomous vehicles).

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate deep learning image analysis with increased modularity and reduced footprint. More specifically, the present inventors devised a deep learning neural network architecture that can perform multiple, different inferencing tasks on inputted medical images, that can do so while consuming fewer computational resources as compared to various existing techniques, and that can do so in a white-box fashion, as opposed to the black-box fashion of various existing techniques.

In particular, such deep learning neural network architecture can accomplish these benefits by including a common backbone (also referred to herein as a shared backbone) in parallel with various task-specific backbones, where the various task-specific backbones can respectively correspond (e.g., in one-to-one fashion) to the multiple, different inferencing tasks. That is, there can be one unique task-specific backbone per unique inferencing task. In various cases, the common backbone can be an order of magnitude, or more, larger (e.g., can contain about ten times more internal parameters) than any one of the various task-specific backbones. As described herein, the common backbone and each of the various task-specific backbones can be trained to independently analyze a given medical image. This can cause the common backbone to produce a first output based on the given medical image, and this can also cause each of the various task-specific backbones to produce a respective second output based on the given medical image. As also described herein, each of such second outputs can be separately concatenated with the first output, thereby forming various concatenations (e.g., one concatenation per task-specific backbone). As further described herein, the deep learning neural network architecture can include various task-specific heads that correspond to the various task-specific backbones (e.g., one task-specific head per task-specific backbone). In various cases, each of the various task-specific heads can be configured to perform a respective one of the multiple, different inferencing tasks, by receiving as input a respective one of the various concatenations.

As explained herein, implementation of the common backbone in parallel with the various task-specific backbones can reduce consumption of computational resources. Indeed, because the common backbone and each of the various task-specific backbones can be in parallel with each other, they can each analyze the given medical image simultaneously or otherwise in chronologically overlapping fashion. Likewise, the various task-specific heads can be in parallel with each other, meaning that they can analyze their respective inputted concatenations simultaneously or otherwise in chronologically overlapping fashion. This can save inferencing time, as compared to existing techniques that implement a separate, distinct deep learning neural network for each inferencing task.

Furthermore, because the various second outputs generated by the various task-specific backbones can each be separately concatenated with the first output generated by the common backbone, the common backbone can be considered as contributing its analysis to all of the multiple, different inferencing tasks, without having to be repetitively stored or repetitively executed. This can save computer memory or processing power, as compared to existing techniques that implement a separate, distinct deep learning neural network for each inferencing task. Indeed, the present inventors realized that, when multiple, different inferencing tasks are all performed on a medical image, such multiple, different inferencing tasks can all involve at least some amount of common analysis (e.g., even though the tasks are different, some amount of analysis among the tasks can be common since they are all being performed on common imaging data). Accordingly, the present inventors realized that, when multiple, different deep learning neural networks are respectively trained to perform the multiple, different inferencing tasks, at least some portions of those multiple, different deep learning neural networks can all be considered as performing a common analysis as each other. In other words, such portions can be considered as redundant (e.g., as being repetitively stored or repetitively executed). Thus, the present inventors realized that computer memory or processing capacity can be saved by replacing such redundant portions of the multiple, different deep learning neural networks with the common backbone.

Further still, because the various task-specific backbones can be distinct or otherwise isolated from each other and from the common backbone, it can be known which specific internal parameters of such deep learning neural network architecture influence which of the multiple, different inferencing tasks in which ways. Accordingly, any particular task-specific backbone or task-specific head can be retrained or revalidated without affecting the common backbone or any of the other task-specific backbones or task-specific heads. In other words, such a deep learning neural network architecture can be considered as a modular white-box structure, as opposed to an opaque black-box structure. This can be advantageous as compared to existing techniques that train a single deep learning neural network to perform multiple, different inferencing tasks via a fully-connected internal architecture.

Various embodiments described herein can be considered as a computerized tool (e.g., any suitable combination of computer-executable hardware or computer-executable software) that can facilitate deep learning image analysis with increased modularity and reduced footprint. In various aspects, such computerized tool can comprise an access component, an inference component, or a result component.

In various embodiments, there can be medical imaging data. In various aspects, the medical imaging data can be any suitable electronic data that can include any suitable number of medical images pertaining to a medical patient (e.g., human, animal, or otherwise). For example, in some cases, the medical imaging data can include one medical image pertaining to the medical patient, where such one medical image can depict one or more anatomical structures (e.g., tissues, organs, body parts, or portions thereof) of the medical patient according to one imaging modality (e.g., the one medical image can be generated or captured by a CT scanner). As another example, in other cases, the medical imaging data can include multiple medical images pertaining to the medical patient, with each of such multiple medical images depicting the one or more anatomical structures of the medical patient according to a respective imaging modality (e.g., a first medical image in the medical imaging data can be generated or captured by a CT scanner, a second medical image in the medical imaging data can be generated or captured by an MRI scanner, a third medical image in the medical imaging data can be generated or captured by an X-ray scanner, a fourth medical image in the medical imaging data can be generated or captured by a PET scanner, a fifth medical image in the medical imaging data can be generated or captured by an ultrasound scanner). In any case, a medical image can exhibit any suitable format, size, or dimensionality (e.g., a medical image can be a two-dimensional pixel array or a three-dimensional voxel array).

In various aspects, it can be desired to perform a plurality of inferencing tasks on the medical imaging data. In various instances, non-limiting examples of an inferencing task can include image quality enhancement, image denoising, image kernel transformation, image deconvolution, image segmentation, or image classification. In any case, the computerized tool can facilitate, as described herein, such plurality of inferencing tasks on the medical imaging data.

In various embodiments, the access component of the computerized tool can electronically receive or otherwise electronically access the medical imaging data. In some aspects, the access component can electronically retrieve the medical imaging data from any suitable centralized or decentralized data structures (e.g., graph data structures, relational data structures, hybrid data structures), whether remote from or local to the access component. In other aspects, the access component can electronically retrieve the medical imaging data from whichever medical imaging devices (e.g., CT scanner, MRI scanner, X-ray scanner, PET scanner, ultrasound scanner) generated or captured the medical imaging data. In any case, the access component can electronically obtain or access the medical imaging data, such that other components of the computerized tool can electronically interact with (e.g., read, write, edit, copy, manipulate) the medical imaging data.

In various embodiments, the inference component of the computerized tool can electronically store, maintain, control, or otherwise access a deep learning neural network. In various aspects, the deep learning neural network can be configured or trained, as described herein, to perform the plurality of inferencing tasks on inputted medical images. Accordingly, in various instances, the inference component can electronically execute the deep learning neural network on the medical imaging data, thereby causing the deep learning neural network to produce a plurality of inferencing results respectively corresponding to the plurality of inferencing tasks (e.g., one inferencing result per inferencing task).

In various cases, an inferencing result can be any suitable electronic data whose format, size, or dimensionality can depend upon the inferencing task to which that inferencing result corresponds. As an example, if a particular inferencing task is image quality enhancement, then an inferencing result corresponding to that particular inferencing task can be an inferred/predicted quality-enhanced version of a medical image that is in the medical imaging data. As another example, if a particular inferencing task is image denoising, then an inferencing result corresponding to that particular inferencing task can be an inferred/predicted denoised version of a medical image that is in the medical imaging data. As yet another example, if a particular inferencing task is image kernel transformation, then an inferencing result corresponding to that particular inferencing task can be an inferred/predicted kernel-transformed version of a medical image that is in the medical imaging data. As still another example, if a particular inferencing task is image segmentation, then an inferencing result corresponding to that particular inferencing task can be an inferred/predicted segmentation mask of a medical image that is in the medical imaging data. As even another example, if a particular inferencing task is image classification, then an inferencing result corresponding to that particular inferencing task can be an inferred/predicted classification label of a medical image that is in the medical imaging data.

As explained herein, the internal architecture of the deep learning neural network can be configured such that the deep learning neural network can consume fewer computational resources, as compared to a plurality of deep learning neural networks collectively trained to perform the plurality of inferencing tasks. As also explained herein, the internal architecture of the deep learning neural network can be configured such that the deep learning neural network exhibits improved modularity or less internal opaqueness, as compared to a deep learning neural network that performs the plurality of inferencing tasks via a fully-connected internal architecture.

In particular, the deep learning neural network can include a backbone portion, a concatenation portion, or a head portion.

In various aspects, the backbone portion can include a common backbone, a plurality of modality-specific backbones, or a plurality of task-specific backbones, all of which can be in parallel with each other. In various instances, the common backbone can include any suitable numbers of any suitable types of neural network layers (e.g., input layer, one or more hidden layers, output layer, any of which can be convolutional layers, dense layers, non-linearity layers, pooling layers, batch normalization layers, or padding layers), can include any suitable numbers of neurons in various layers (e.g., different layers can have the same or different numbers of neurons as each other), can include any suitable activation functions (e.g., softmax, sigmoid, hyperbolic tangent, rectified linear unit) in various neurons (e.g., different neurons can have the same or different activation functions as each other), or can include any suitable interneuron connections or interlayer connections (e.g., forward connections, skip connections, recurrent connections).

In various aspects, the plurality of modality-specific backbones can include any suitable number of modality-specific backbones. In various instances, a modality-specific backbone can include any suitable numbers of any suitable types of layers (e.g., input layer, one or more hidden layers, output layer, any of which can be convolutional layers, dense layers, non-linearity layers, pooling layers, batch normalization layers, or padding layers), can include any suitable numbers of neurons in various layers (e.g., different layers can have the same or different numbers of neurons as each other), can include any suitable activation functions (e.g., softmax, sigmoid, hyperbolic tangent, rectified linear unit) in various neurons (e.g., different neurons can have the same or different activation functions as each other), or can include any suitable interneuron connections or interlayer connections (e.g., forward connections, skip connections, recurrent connections). In various cases, a modality-specific backbone can be an order of magnitude smaller (e.g., can contain an order of magnitude fewer internal parameters) than the common backbone. As mentioned above, each modality-specific backbone can be in parallel with the common backbone. Furthermore, in various aspects, each modality-specific backbone can be isolated from the common backbone (e.g., there can be an absence of forward connections or skip connections between the common backbone and any modality-specific backbone). Likewise, in various instances, each modality-specific backbone can be isolated from every other modality-specific backbone (e.g., there can be an absence of forward connections or skip connections between any two modality-specific backbones).

In various aspects, the plurality of task-specific backbones can respectively correspond (e.g., in one-to-one fashion) to the plurality of inferencing tasks. In other words, there can be one unique task-specific backbone per unique inferencing task. In various instances, a task-specific backbone can include any suitable numbers of any suitable types of layers (e.g., input layer, one or more hidden layers, output layer, any of which can be convolutional layers, dense layers, non-linearity layers, pooling layers, batch normalization layers, or padding layers), can include any suitable numbers of neurons in various layers (e.g., different layers can have the same or different numbers of neurons as each other), can include any suitable activation functions (e.g., softmax, sigmoid, hyperbolic tangent, rectified linear unit) in various neurons (e.g., different neurons can have the same or different activation functions as each other), or can include any suitable interneuron connections or interlayer connections (e.g., forward connections, skip connections, recurrent connections). In various cases, a task-specific backbone can be an order of magnitude smaller (e.g., can contain an order of magnitude fewer internal parameters) than a modality-specific backbone or the common backbone. As mentioned above, each task-specific backbone can be in parallel with the common backbone. Furthermore, in various aspects, each task-specific backbone can be isolated from the common backbone (e.g., there can be an absence of forward connections or skip connections between the common backbone and any task-specific backbone). Likewise, in various instances, each task-specific backbone can be isolated from every other task-specific backbone (e.g., there can be an absence of forward connections or skip connections between any two task-specific backbones). Further still, in various cases, each task-specific backbone can be isolated from every modality-specific backbone (e.g., for any task-specific backbone and modality-specific backbone, there can be an absence of forward connections or skip connections between them).

In various aspects, respective ones of the set of modality-specific backbones can correspond to respective subsets of the plurality of task-specific backbones. More specifically, each of the plurality of modality-specific backbones can be considered as being associated with a respective medical imaging modality (e.g., a first modality-specific backbone can be associated with a CT medical imaging modality, a second modality-specific backbone can be associated with an MRI medical imaging modality, a third modality-specific backbone can be associated with an X-ray medical imaging modality, a fourth modality-specific backbone can be associated with a PET medical imaging modality, a fifth modality-specific backbone can be associated with an ultrasound medical imaging modality). Moreover, in various instances, the plurality of task-specific backbones can be considered as being made up of multiple, disjoint groupings (e.g., multiple, disjoint subsets) that can be collated by medical imaging modality (e.g., a first grouping of task-specific backbones can be associated with a CT medical imaging modality, a second grouping of task-specific backbones can be associated with an MRI medical imaging modality, a third grouping of task-specific backbones can be associated with an X-ray medical imaging modality, a fourth grouping of task-specific backbones can be associated with a PET medical imaging modality, a fifth grouping of task-specific backbones can be associated with an ultrasound medical imaging modality). In various cases, if a particular modality-specific backbone is associated with a particular medical imaging modality, and if a particular grouping of task-specific backbones is also associated with that same particular medical imaging modality, then such particular modality-specific backbone can be considered as corresponding to such particular grouping of task-specific backbones (e.g., a modality-specific backbone associated with a CT medical imaging modality can be considered as corresponding to whichever grouping of task-specific backbones are also associated with a CT medical imaging modality; a modality-specific backbone associated with an MRI medical imaging modality can be considered as corresponding to whichever grouping of task-specific backbones are also associated with an MRI medical imaging modality). In this way, each grouping of task-specific backbones can correspond to a respective one of the plurality of modality-specific backbones (e.g., any given task-specific backbone can correspond to a respective modality-specific backbone; any given modality-specific backbone can correspond to one or more task-specific backbones).

In various aspects, the common backbone can be configured to receive as input the medical imaging data and to produce a first intermediate output. More specifically, an input layer of the common backbone can receive the medical imaging data as input, the medical imaging data can complete a forward pass through one or more hidden layers of the common backbone, and an output layer of the common backbone can compute the first intermediate output based on activations provided by the one or more hidden layers of the common backbone. In various instances, the first intermediate output can be any suitable electronic data having any suitable format, size, or dimensionality (e.g., can be one or more scalars, one or more vectors, one or more matrices, one or more tensors, or one or more character strings).

In various aspects, the plurality of modality-specific backbones can be configured to receive as input the medical imaging data (or any suitable portions thereof) and to produce a plurality of second intermediate outputs. More specifically, for any given modality-specific backbone, an input layer of the given modality-specific backbone can receive the medical imaging data (or any suitable portion thereof) as input, the medical imaging data (or any suitable portion thereof) can complete a forward pass through one or more hidden layers of the given modality-specific backbone, and an output layer of the given modality-specific backbone can compute a respective one of the plurality of second intermediate outputs based on activations provided by the one or more hidden layers of the given modality-specific backbone. In various instances, a second intermediate output can be any suitable electronic data having any suitable format, size, or dimensionality (e.g., can be one or more scalars, one or more vectors, one or more matrices, one or more tensors, or one or more character strings). In various cases, different modality-specific backbones can receive as input the same or different portions of the medical imaging data as each other (e.g., a modality-specific backbone that is associated with a CT medical imaging modality can receive as input a CT scanned image that is in the medical imaging data; a modality-specific backbone that is associated with an X-ray medical imaging modality can receive as input an X-ray scanned image that is in the medical imaging data).

In various aspects, the plurality of task-specific backbones can be configured to receive as input the medical imaging data (or any suitable portions thereof) and to produce a plurality of third intermediate outputs. More specifically, for any given task-specific backbone, an input layer of the given task-specific backbone can receive the medical imaging data (or any suitable portion thereof) as input, the medical imaging data (or any suitable portion thereof) can complete a forward pass through one or more hidden layers of the given task-specific backbone, and an output layer of the given task-specific backbone can compute a respective one of the plurality of third intermediate outputs based on activations provided by the one or more hidden layers of the given task-specific backbone. In various instances, a third intermediate output can be any suitable electronic data having any suitable format, size, or dimensionality (e.g., can be one or more scalars, one or more vectors, one or more matrices, one or more tensors, or one or more character strings). In various cases, different task-specific backbones can receive as input the same or different portions of the medical imaging data as each other (e.g., a task-specific backbone that is associated with a PET medical imaging modality can receive as input a PET scanned image that is in the medical imaging data; a task-specific backbone that is associated with an ultrasound medical imaging modality can receive as input an ultrasound scanned image that is in the medical imaging data).

In various aspects, the concatenation portion of the deep learning neural network can include a plurality of concatenation layers, all of which can be in parallel with each other. In various instances, the plurality of concatenation layers can be respectively in series with the plurality of task-specific backbones. That is, for any given task-specific backbone, there can be a respective concatenation layer that is serially downstream from that given task-specific backbone. In any case, a concatenation layer can be any suitable neural network layer that can concatenate two or more inputs together.

In various aspects, respective ones of the plurality of concatenation layers can concatenate respective ones of the plurality of third intermediate outputs with the first intermediate output or with respective ones of the plurality of second intermediate outputs. As a non-limiting example, for any given task-specific backbone, such given task-specific backbone can be considered as corresponding to a given modality-specific backbone. Moreover, such given task-specific backbone can be serially upstream from a given concatenation layer. In various instances, that given concatenation layer can receive as input: whichever of the plurality of third intermediate outputs was produced by that given task-specific backbone; whichever of the plurality of second intermediate outputs was produced by that given modality-specific backbone; and the first intermediate output produced by the common backbone. Accordingly, in such case, the given concatenation layer can concatenate such inputs togethers, thereby yielding a concatenation. In this way, the plurality of concatenation layers can collectively generate a plurality of concatenations.

In various aspects, the head portion of the deep learning neural network can include a plurality of task-specific heads, all of which can be in parallel with each other. In various instances, the plurality of task-specific heads can be respectively in series with the plurality of concatenation layers. That is, for any given concatenation layer, there can be a respective task-specific head that is serially downstream from that given concatenation layer. In any case, a task-specific head can include any suitable numbers of any suitable types of layers (e.g., input layer, one or more hidden layers, output layer, any of which can be convolutional layers, dense layers, non-linearity layers, pooling layers, batch normalization layers, or padding layers), can include any suitable numbers of neurons in various layers (e.g., different layers can have the same or different numbers of neurons as each other), can include any suitable activation functions (e.g., softmax, sigmoid, hyperbolic tangent, rectified linear unit) in various neurons (e.g., different neurons can have the same or different activation functions as each other), or can include any suitable interneuron connections or interlayer connections (e.g., forward connections, skip connections, recurrent connections). In various aspects, the plurality of task-specific heads can be in parallel with each other. Furthermore, in various instances, each task-specific head can be isolated from every other task-specific head (e.g., there can be an absence of forward connections or skip connections between any two task-specific heads).

In various aspects, the plurality of task-specific heads can respectively generate the plurality of inferencing results, based on the plurality of concatenations. As a non-limiting example, for any given concatenation layer, such given concatenation layer can be serially upstream from a given task-specific head. In various instances, that given task-specific head can receive as input whichever of the plurality of concatenations was produced by that given concatenation layer and can produce as output a respective one of the plurality of inferencing results. More specifically, an input layer of the given task-specific head can receive whichever concatenation was produced by the given concatenation layer, such concatenation can complete a forward pass through one or more hidden layers of the given task-specific head, and an output layer of the given task-specific head can compute a respective one of the plurality of inferencing results based on activations provided by the one or more hidden layers of the given task-specific head. In this way, the plurality of task-specific heads can collectively generate the plurality of inferencing results.

In various embodiments, the result component of the computerized tool can electronically initiate any suitable electronic actions based on the plurality of inferencing results. As an example, the result component can electronically transmit one or more of the plurality of inferencing results to any suitable computing device. As another example, the result component can electronically render one or more of the plurality of inferencing results on any suitable computer screen, monitor, display, or graphical user-interface. As yet another example, the result component can electronically generate any suitable warning or alert, based on the plurality of inferencing results.

To help cause the plurality of inferencing results to be accurate, the deep learning neural network can first undergo any suitable type or paradigm of training (e.g., supervised training, unsupervised training, reinforcement learning).

Accordingly, in various aspects, the access component can receive, retrieve, or otherwise access a training dataset, and the computerized tool can comprise a training component that can train the deep learning neural network on the training dataset.

In some instances, the training dataset can be an annotated training dataset. In such cases, the training dataset can include a set of training inputs and a set of pluralities of ground-truth annotations that respectively correspond to the set of training inputs. In various aspects, any given training input can have the same format, size, or dimensionality as the medical imaging data discussed above. In various instances, since it can be desired to train the deep learning neural network to perform the plurality of inferencing tasks, each training input can correspond to a plurality of ground-truth annotations (e.g., one ground-truth annotation per inferencing task). In various cases, a ground-truth annotation can be considered as a correct or accurate inferencing result that is known or deemed to correspond to a respective training input. In various aspects, a ground-truth annotation can be manually-crafted by technicians. In various other aspects, a ground-truth annotation can be generated by a teacher network (e.g., a pre-trained neural network can have already been trained to perform a given inferencing task on inputted medical imaging data; accordingly, such pre-trained neural network can be fed a training input, which can cause the pre-trained neural network to produce as inferencing result based on the training input, and such inferencing result can be treated or considered as a ground-truth annotation to be used to train the deep learning neural network).

If the training dataset is annotated, then the training component can, in various aspects, perform supervised training on the deep learning neural network. Prior to the start of such supervised training, the internal parameters (e.g., weights, biases, convolutional kernels) of the deep learning neural network (e.g., of the common backbone, of each modality-specific backbone, of each task-specific backbone, of each task-specific head) can be randomly initialized.

In various aspects, the training component can select from the training dataset any suitable training input and any suitable plurality of ground-truth annotations corresponding to such selected training input. In various instances, the training component can feed the selected training input to the deep learning neural network, which can cause the deep learning neural network to produce a plurality of outputs. For example, the training input can complete a forward pass through the backbone portion of the deep learning neural network, through the concatenation portion of the deep learning neural network, and through the head portion of the deep learning neural network, such that each task-specific head can produce a respective one of the plurality of outputs.

In various aspects, the plurality of outputs can be considered as predictions or inferences (e.g., predicted/inferred quality-enhanced images, predicted/inferred kernel-transformed images, predicted/inferred denoised images, predicted/inferred segmentation masks, predicted/inferred classification labels) which the deep learning neural network believes should correspond to the selected training input. In contrast, the selected plurality of ground-truth annotations can be considered as correct or accurate results (e.g., correct/accurate quality-enhanced images, correct/accurate kernel-transformed images, correct/accurate denoised images, correct/accurate segmentation masks, correct/accurate classification labels) that are known or deemed to correspond to the selected training input. Note that, if the deep learning neural network has so far undergone no or little training, then the plurality of outputs can be highly inaccurate (e.g., the plurality of outputs can be very different from the selected plurality of ground-truth annotations).

In any case, the training component can compute one or more errors or losses (e.g., mean absolute errors (MAE), mean squared errors (MSE), cross-entropies) between the plurality of outputs and the selected plurality of ground-truth annotations. In various aspects, the training component can update the internal parameters of the deep learning neural network by performing backpropagation (e.g., stochastic gradient descent) driven by such computed errors or losses.

In various instances, such supervised training procedure can be repeated for each training input in the training dataset, with the result being that the internal parameters of the deep learning neural network can become iteratively optimized to accurately generate predictions/inferences based on inputted medical imaging data. In various cases, the training component can implement any suitable training batch sizes, any suitable training termination criteria, or any suitable error, loss, or objective functions.

In various aspects, such training can be conducted in two phases. In a first phase of such training, the training component can feed selected training inputs to the deep learning neural network and update internal parameters via backpropagation, as described above. However, during such first phase, the training component can apply any suitable regularization terms (e.g., L1 regularization, L2 regularization) to the plurality of task-specific backbones, and the training component can refrain from applying such regularization terms to the common backbone. Such use of regularization can cause the common backbone to learn comparatively more during this first phase of training than the plurality of task-specific backbones. In a second phase of training, the training component can feed selected training inputs to the deep learning neural network and update internal parameters via backpropagation, as described above. However, during such second phase, the training component can remove such regularization terms from the plurality of task-specific backbones, and the training component can freeze internal parameters of the common backbone. In other words, during such second phase of training, the common backbone can remain unchanged, and the task-specific backbones can be considered as being fine-tuned. In some cases, the training component can, during the first phase, apply any suitable regularization terms to the plurality of modality-specific backbones or to the plurality of task-specific heads, and the training component can, during the second phase, remove such regularization terms. However, in other cases, the training component can refrain from applying regularization terms at all to the plurality of modality-specific backbones or to the plurality of task-specific heads.

Note that, if the deep learning neural network performs with sufficient accuracy all but a small minority of the plurality of inferencing tasks, the entirety of the deep learning neural network need not undergo full retraining or revalidation. Instead, the task-specific backbones or task-specific heads that correspond to such small minority of inferencing tasks can be identified, those identified task-specific backbones or task-specific heads can be retrained and revalidated, and the remainder of the deep learning neural network (e.g., common backbone, plurality of modality-specific backbones, rest of the plurality of task-specific backbones, rest of the plurality of task-specific heads) can be frozen (e.g., can remain unchanged) during such retraining. Contrast this with existing techniques that utilize fully-connected architectures, in which case full retraining would be warranted.

Further, note that, if it is desired to teach the deep learning neural network how to perform a new inferencing task, an entirety of the deep learning neural network need not undergo full retraining or revalidation. Instead, in various aspects, a new task-specific backbone can be inserted into the plurality of task-specific backbones, a new concatenation layer can be inserted into the plurality of concatenation layers to be in series with the new task-specific backbone, a new task-specific head can be inserted into the plurality of task-specific heads to be in series with the new concatenation layer, and new ground-truth annotations corresponding to the new inferencing task can be correlated to the training inputs (e.g., such new ground-truth annotations can be generated by a new pre-trained teacher network). In such case, the training component can train the new task-specific backbone and the new task-specific head, while freezing a remainder of the deep learning neural network (e.g., while leaving the common backbone, the plurality of modality-specific backbones, the rest of the plurality of task-specific backbones, and the rest of the plurality of task-specific heads unchanged). Again, contrast this with existing techniques that utilize fully-connected architectures, in which case full retraining would be warranted.

Further still, note that one or more of the plurality of inferencing tasks can be removed from the repertoire of the deep learning neural network without affecting the rest of the plurality of inferencing tasks. In particular, suppose that it is desired to prevent the deep learning neural network from performing a given one of the plurality of inferencing tasks. In such case, it can be known which particular task-specific backbone of the plurality of task-specific backbones, which particular concatenation layer of the plurality of concatenation layers, and which particular task-specific head of the plurality of task-specific heads correspond to that given inferencing task. Accordingly, such particular task-specific backbone, such particular concatenation layer, and such particular task-specific head can be deleted, removed, or otherwise deactivated, thereby causing the deep learning neural network to no longer perform the given inferencing task. However, such deletion, removal, or deactivation can refrain from affecting the rest of the deep learning neural network (e.g., can refrain from affecting the common backbone, the plurality of modality-specific backbones, the rest of the plurality of task-specific backbones, the rest of the plurality of concatenation layers, and the rest of the plurality of task-specific heads). In this way, inferencing tasks can be selectively removed from the repertoire of the deep learning neural network without affecting other portions of the deep learning neural network.

In any case, the common backbone can be considered as performing analytical work that is useful (e.g., that is common) across all of the plurality of inferencing tasks, a modality-specific backbone can be considered as performing analytical work that is useful (e.g., that is common) across a subset (e.g., modality-collated grouping) of the plurality of inferencing tasks, and a task-specific backbone can be considered as performing analytical work that is useful only for a respective one of the plurality of inferencing tasks. Thus, by implementing the common backbone or the plurality of modality-specific backbones, consumption of computational resources can be reduced, as compared to existing techniques. Furthermore, because the common backbone, the plurality of modality-specific backbones, and the plurality of task-specific backbones can all be isolated or otherwise distinct from each other, the deep learning neural network can be considered as having a transparent, modular, white-box architecture (e.g., changes to the common backbone do not affect any of the modality-specific backbones or any of the task-specific backbones; changes to a modality-specific backbone do not affect any other modality-specific backbones, the common backbone, or any of the task-specific backbones; changes to a task-specific backbone do not affect any other task-specific backbone, the common backbone, or any of the modality-specific backbones). Accordingly, if it is desired to improve the deep learning neural network's performance with respect to a particular inferencing task, the discrete task-specific backbone that corresponds to such particular inferencing task can be retrained or revalidated without affecting other portions of the deep learning neural network. Likewise, if it is desired to teach the deep learning neural network how to perform a new inferencing task, a new task-specific backbone (and a new concatenation layer and a new task-specific head) can be added to the deep learning neural network and can be trained or validated without affecting other portions of the deep learning neural network. Thus, by implementing the common backbone, the plurality of modality-specific backbones, or the plurality of task-specific backbones as described herein, modularity or transparency of the deep learning neural network can be improved, as compared to existing techniques.

Various embodiments described herein can be employed to use hardware or software to solve problems that are highly technical in nature (e.g., to facilitate deep learning image analysis with increased modularity and reduced footprint), that are not abstract and that cannot be performed as a set of mental acts by a human. Further, some of the processes performed can be performed by a specialized computer (e.g., a deep learning neural network having internal parameters such as convolutional kernels) for carrying out defined tasks related to deep learning image analysis with increased modularity and reduced footprint. For example, such defined tasks can include: accessing, by a device operatively coupled to a processor, medical imaging data; and performing, by the device and via execution of a deep learning neural network, a plurality of inferencing tasks on the medical imaging data, wherein the deep learning neural network comprises a common backbone in parallel with a plurality of task-specific backbones, and wherein the plurality of task-specific backbones respectively correspond to the plurality of inferencing tasks. In various aspects, the deep learning neural network can further comprise a plurality of modality-specific backbones in parallel with the common backbone and in parallel with the plurality of task-specific backbones, wherein respective ones of the plurality of modality-specific backbones correspond to respective subsets of the plurality of task-specific backbones. In various instances, the deep learning neural network can further comprise a plurality of concatenation layers respectively in series with the plurality of task-specific backbones, wherein the common backbone can receive the medical imaging data as input and can produce a first intermediate output, wherein the plurality of modality-specific backbones can receive the medical imaging data as input and can produce a plurality of second intermediate outputs, wherein the plurality of task-specific backbones can receive the medical imaging data as input and can produce a plurality of third intermediate outputs, and wherein the plurality of concatenation layers can concatenate respective ones of the plurality of third intermediate outputs with the first intermediate output and with respective ones of the plurality of second intermediate outputs, thereby yielding a plurality of concatenations. In various cases, the deep learning neural network can further comprise a plurality of task-specific heads respectively in series with the plurality of concatenation layers, wherein the plurality of task-specific heads can receive the plurality of concatenations as input and produce a plurality of inferencing outputs that respectively correspond to the plurality of inferencing tasks.

Such defined tasks are not performed manually by humans. Indeed, neither the human mind nor a human with pen and paper can electronically access medical images (e.g., two-dimensional pixel arrays, three-dimensional voxel arrays) and electronically execute a deep learning neural network on the medical images. Indeed, a deep learning neural network is an inherently-computerized construct that simply cannot be implemented in any way by the human mind without computers. Accordingly, a computerized tool that can train or execute a deep learning neural network is likewise inherently-computerized and cannot be implemented in any sensible, practical, or reasonable way without computers.

Moreover, various embodiments described herein can integrate into a practical application various teachings relating to deep learning image analysis with increased modularity and reduced footprint. As explained above, some existing techniques train multiple, different deep learning neural networks to collectively perform multiple, different inferencing tasks on inputted medical images. However, such techniques can consume excessive computational resources. As also explained above, other existing techniques train a single deep learning neural network to perform all of such multiple, different inferencing tasks, where such single deep learning neural network utilizes a fully-connected internal architecture. Unfortunately, such techniques can be considered as opaque black-boxes that lack modularity.

Various embodiments described herein can address these technical problems. Specifically, the present inventors devised a deep learning neural network architecture that, as described herein, can consume fewer computational resources or exhibit increased modularity, as compared to existing techniques. In particular, such deep learning neural network architecture can include a common backbone in parallel with a plurality of task-specific backbones. In various aspects, each task-specific backbone can be considered as performing analytical work that is useful for a single, respective inferencing task, whereas the common backbone can be considered as performing analytical work that is useful across multiple, different inferencing tasks. By implementing such internal architecture, the deep learning neural network can consume less inferencing time, less computer memory, or less computer processing power, as compared to existing techniques that train multiple, different deep learning neural networks to collectively perform multiple, different inferencing tasks (e.g., such existing techniques can be considered as redundantly storing or executing neural network layers that perform the same analytic work as each other). Furthermore, by implementing such internal architecture, it can be known which particular internal parameters of the deep learning neural network affect or influence which particular inferencing tasks. That is, the deep learning neural network can be considered as a transparent white-box rather than an opaque black-box, as opposed to techniques that train a single deep learning neural network with a fully-connected architecture to perform multiple, different inferencing tasks. Thus, various embodiments described herein certainly constitute a concrete and tangible technical improvement in the field of deep learning. Therefore, various embodiments described herein clearly qualify as useful and practical applications of computers.

Furthermore, various embodiments described herein can control real-world tangible devices based on the disclosed teachings. For example, various embodiments described herein can electronically execute (or train) a real-world deep learning neural network on real-world medical images (e.g., CT images, MRI images, X-ray images, PET images, ultrasound images), and can electronically render any results produced by such real-world deep learning neural network on real-world computer screens.

It should be appreciated that the herein figures and description provide non-limiting examples of various embodiments and are not necessarily drawn to scale.

FIG. 1 illustrates a block diagram of an example, non-limiting system 100 that can facilitate deep learning image analysis with increased modularity and reduced footprint in accordance with one or more embodiments described herein. As shown, an image analysis system 102 can be electronically integrated, via any suitable wired or wireless electronic connections, with medical imaging data 104.

In various embodiments, the medical imaging data 104 can comprise any suitable number of medical images associated with a medical patient. As a non-limiting example, the medical imaging data 104 can comprise one medical image that depicts, according to one medical imaging modality, any suitable anatomical structure of the medical patient. For instance, the medical imaging data 104 can be an X-ray scanned image depicting the anatomical structure of the medical patient. As another non-limiting example, the medical imaging data 104 can comprise a plurality of medical images, with each medical image depicting, according to a respective medical imaging modality, the anatomical structure of the medical image. For instance, a first medical image in the medical imaging data 104 can be an X-ray scanned image depicting the anatomical structure of the medical patient, a second medical image in the medical imaging data 104 can be a CT scanned image depicting the same anatomical structure of the same medical patient, or a third medical image in the medical imaging data 104 can be an MRI scanned image depicting the same anatomical structure of the same medical patient.

In any case, a medical image of the medical imaging data 104 can exhibit any suitable format, size, or dimensionality. For example, a medical image can be an x-by-y pixel array of Hounsfield unit values, for any suitable positive integers x and y. As another example, a medical image can be an x-by-y-by-z voxel array of Hounsfield unit values for any suitable positive integers x, y, and z. In various instances, different medical images in the medical imaging data 104 can have the same or different formats, sizes, or dimensionalities as each other.

In various embodiments, it can be desired to perform a plurality of inferencing tasks on the medical imaging data 104. Non-limiting examples of such inferencing tasks can include: quality enhancement of CT scanned images; quality enhancement of X-ray scanned images; quality enhancement of MRI scanned images; quality enhancement of PET scanned images; quality enhancement of ultrasound scanned images; denoising of CT scanned images; denoising of X-ray scanned images; denoising of MRI scanned images; denoising of PET scanned images; denoising of ultrasound scanned images; kernel-transformation of CT scanned images; kernel-transformation of X-ray scanned images; kernel-transformation of MRI scanned images; kernel-transformation of PET scanned images; kernel-transformation of ultrasound scanned images; segmentation of CT scanned images; segmentation of X-ray scanned images; segmentation of MRI scanned images; segmentation of PET scanned images; segmentation of ultrasound scanned images; classification of CT scanned images; classification of X-ray scanned images; classification of MRI scanned images; classification of PET scanned images; classification of ultrasound scanned images; object localization within CT scanned images; object localization within X-ray scanned images; object localization within MRI scanned images; object localization within PET scanned images; or object localization within ultrasound scanned images. In any case, the image analysis system 102 can perform such plurality of inferencing tasks on the medical imaging data 104, as described herein.

In various embodiments, the image analysis system 102 can comprise a processor 106 (e.g., computer processing unit, microprocessor) and a non-transitory computer-readable memory 108 that is operably or operatively or communicatively connected or coupled to the processor 106. The non-transitory computer-readable memory 108 can store computer-executable instructions which, upon execution by the processor 106, can cause the processor 106 or other components of the image analysis system 102 (e.g., access component 110, inference component 112, result component 114) to perform one or more acts. In various embodiments, the non-transitory computer-readable memory 108 can store computer-executable components (e.g., access component 110, inference component 112, result component 114), and the processor 106 can execute the computer-executable components.

In various embodiments, the image analysis system 102 can comprise an access component 110. In various aspects, the access component 110 can electronically receive or otherwise electronically access the medical imaging data 104. In various instances, the access component 110 can electronically retrieve the medical imaging data 104 from any suitable centralized or decentralized data structures (not shown) or from any suitable centralized or decentralized computing devices (not shown). As a non-limiting example, whatever medical imaging devices (e.g., CT scanners, MRI scanners, X-ray scanners, PET scanners, ultrasound scanners) generated or captured the medical imaging data 104 can transmit the medical imaging data 104 to the access component 110. In any case, the access component 110 can electronically obtain or access the medical imaging data 104, such that other components of the image analysis system 102 can electronically interact with the medical imaging data 104.

In various embodiments, the image analysis system 102 can comprise an inference component 112. In various aspects, as described herein, the inference component 112 can execute a deep learning neural network on the medical imaging data 104, thereby yielding a plurality of inferencing outputs that respectively correspond to the plurality of inferencing tasks.

In various embodiments, the image analysis system 102 can comprise a result component 114. In various instances, as described herein, the result component 114 can transmit any of the plurality of inferencing outputs to any suitable computing devices, or can render any of the plurality of inferencing outputs on any suitable computer display.

Figure 2:
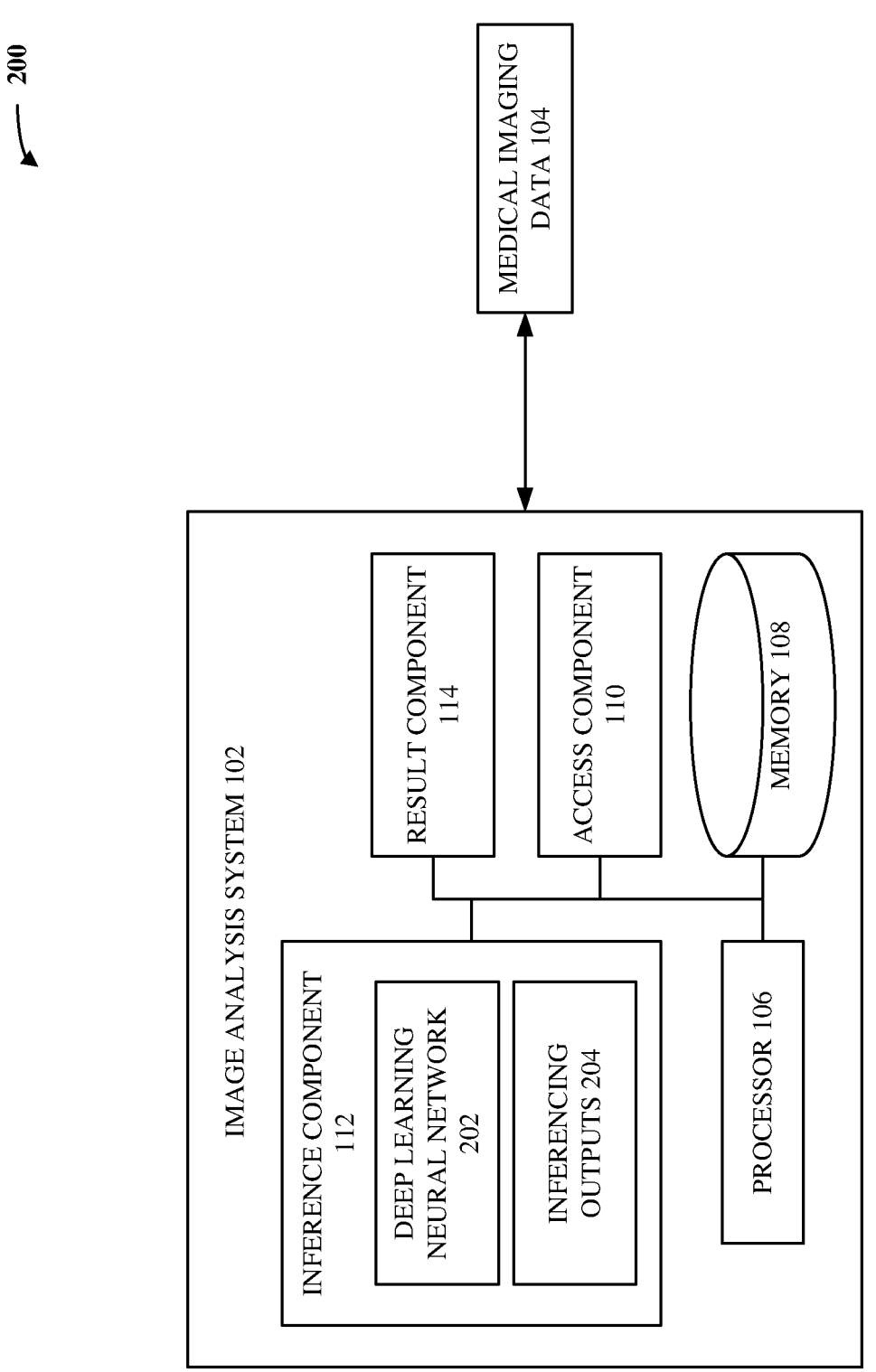
FIG. 2 illustrates a block diagram of an example, non-limiting system including a deep learning neural network and a plurality of inferencing outputs that facilitates deep learning image analysis with increased modularity and reduced footprint in accordance with one or more embodiments described herein.

FIG. 2 illustrates a block diagram of an example, non-limiting system 200 including a deep learning neural network and a plurality of inferencing outputs that can facilitate deep learning image analysis with increased modularity and reduced footprint in accordance with one or more embodiments described herein. As shown, the system 200 can, in some cases, comprise the same components as the system 100, and can further comprise a deep learning neural network 202 or a plurality of inferencing outputs 204.

In various embodiments, the inference component 112 can electronically store, electronically maintain, electronically control, or otherwise electronically access the deep learning neural network 202. In various aspects, the deep learning neural network 202 can be configured, as described herein, to perform the plurality of inferencing tasks on inputted medical images. Accordingly, in various instances, the inference component 112 can electronically execute the deep learning neural network 202 on the medical imaging data 104, thereby yielding the plurality of inferencing outputs 204. Various non-limiting aspects are described more with respect to FIGS. 3-6.

FIG. 3 illustrates an example, non-limiting block diagram showing how a deep learning neural network can include a backbone portion, a concatenation portion, and a head portion in accordance with one or more embodiments described herein. In other words, FIG. 3 shows an example, non-limiting block diagram of an internal architecture of the deep learning neural network 202.

As shown, the deep learning neural network 202 can comprise a backbone portion 302, a concatenation portion 304, or a head portion 306. In various aspects, the concatenation portion 304 can be serially downstream of (e.g., downstream of and in series with) the backbone portion 302, and the head portion 306 can be serially downstream of the concatenation portion 304.

In various instances, as shown, the inference component 112 can execute the deep learning neural network 202 on the medical imaging data 104. That is, the medical imaging data 104 can complete a forward pass through the backbone portion 302, through the concatenation portion 304, and through the head portion 306, which can cause the head portion 306 to produce the plurality of inferencing outputs 204.

In various aspects, the plurality of inferencing outputs 204 can respectively correspond (e.g., in one-to-one fashion) to the plurality of inferencing tasks. In other words, the plurality of inferencing outputs 204 can include one unique inferencing output per unique inferencing task that is desired to be executed on the medical imaging data 104. In various instances, an inferencing output can be any suitable electronic data exhibiting any suitable format, size, or dimensionality. For example, an inferencing output can be one or more scalars, one or more vectors, one or more matrices, one or more tensors, one or more character strings, or any suitable combination thereof. In some cases, the format, size, or dimensionality of an inferencing output can depend upon whichever inferencing task corresponds to that inferencing output. For example, if an inferencing output corresponds to a CT quality enhancement inferencing task, then that inferencing output can be considered as a quality-enhanced version of a CT image included or otherwise specified in the medical imaging data 104. As another example, if an inferencing output corresponds to an MRI denoising inferencing task, then that inferencing output can be considered as a denoised version of an MRI image included or otherwise specified in the medical imaging data 104. As yet another example, if an inferencing output corresponds to an X-ray segmentation inferencing task, then that inferencing output can be considered as a segmentation mask of an X-ray image included or otherwise specified in the medical imaging data 104. As still another example, if an inferencing output corresponds to an ultrasound classification inferencing task, then that inferencing output can be considered as a classification label of an ultrasound image included or otherwise specified in the medical imaging data 104.

Figure 4:
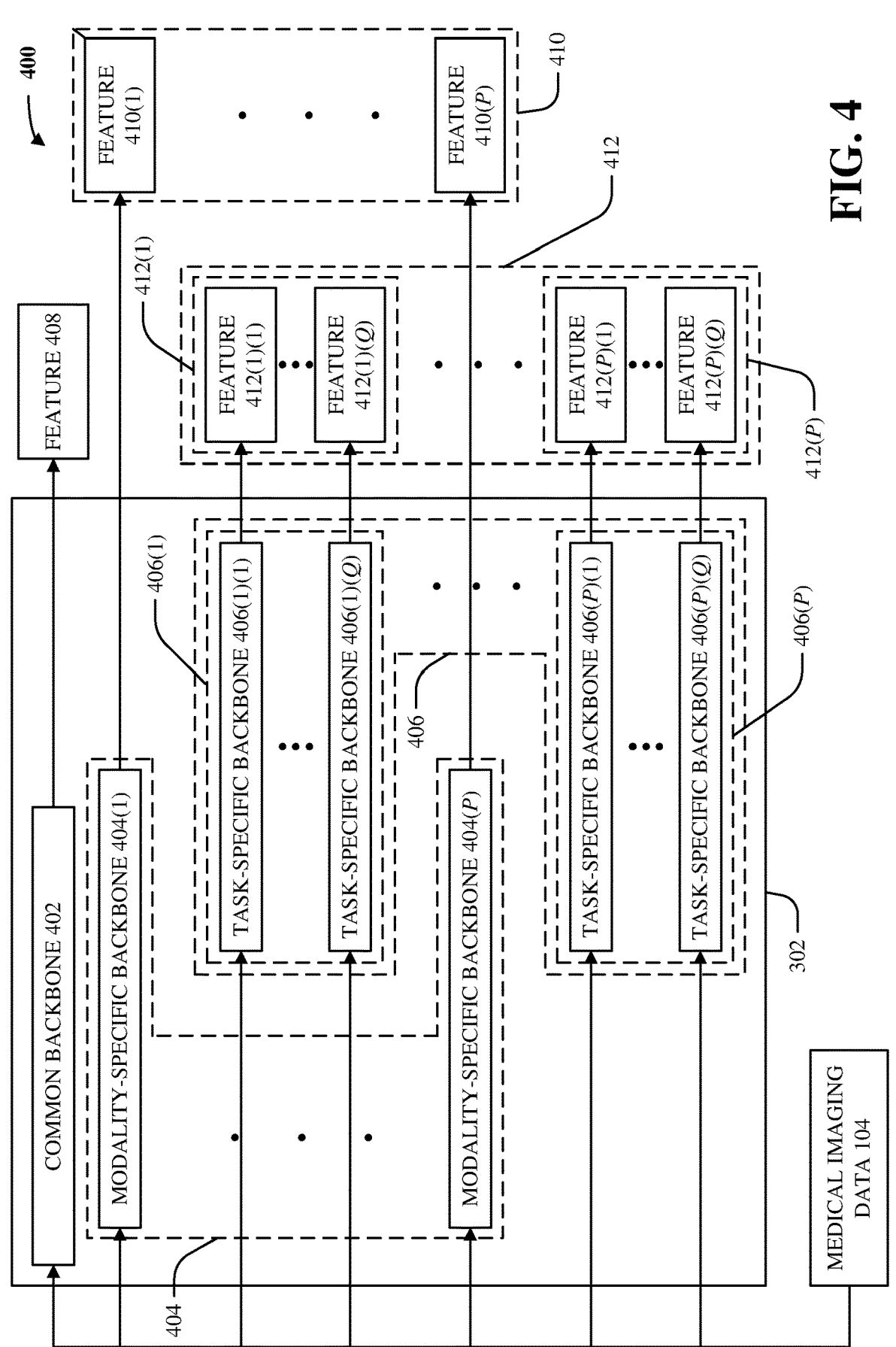
FIG. 4 illustrates an example, non-limiting block diagram of a backbone portion of a deep learning neural network in accordance with one or more embodiments described herein.
Figure 5:
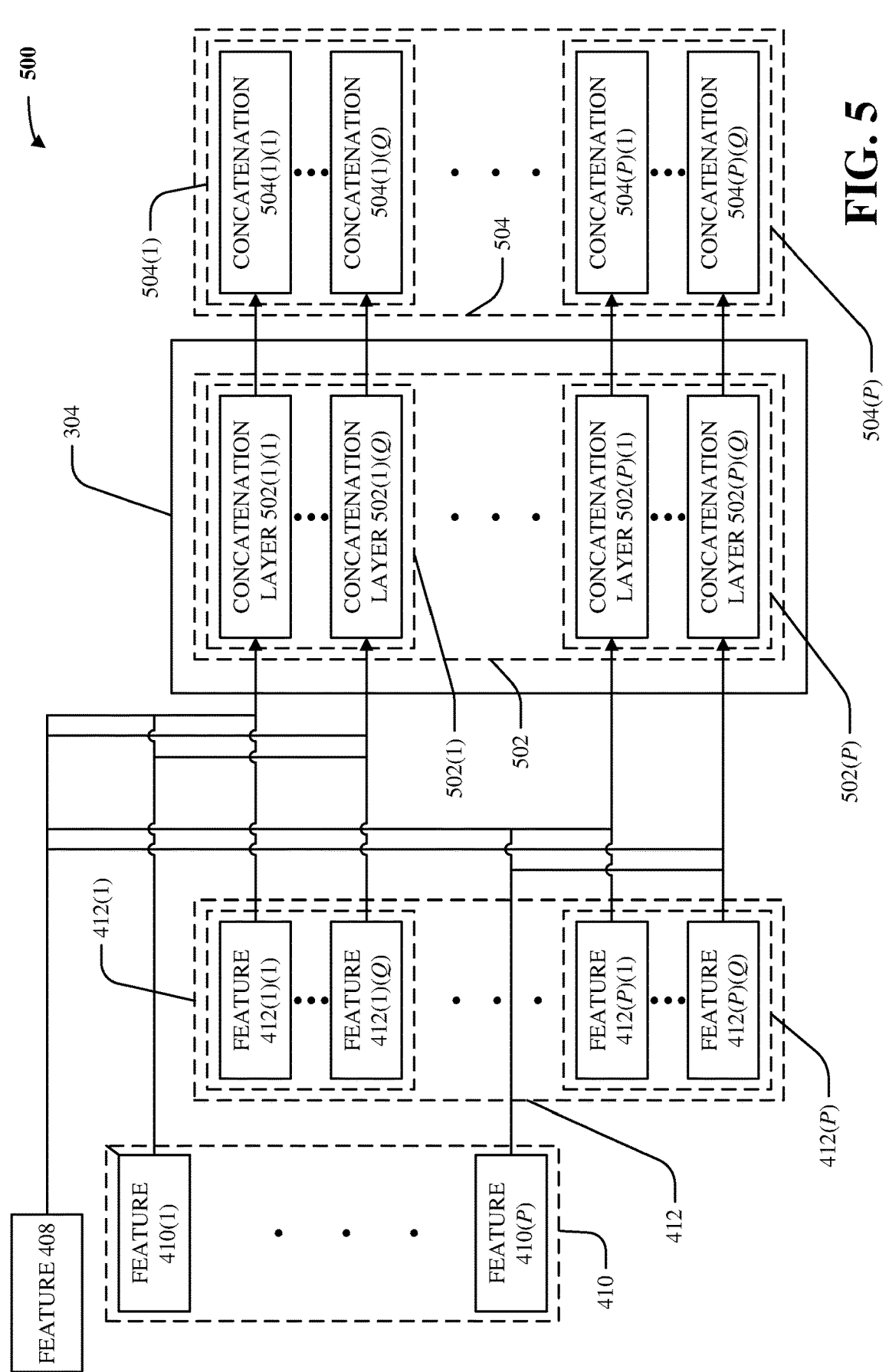
FIG. 5 illustrates an example, non-limiting block diagram of a concatenation portion of a deep learning neural network in accordance with one or more embodiments described herein.
Figure 6:
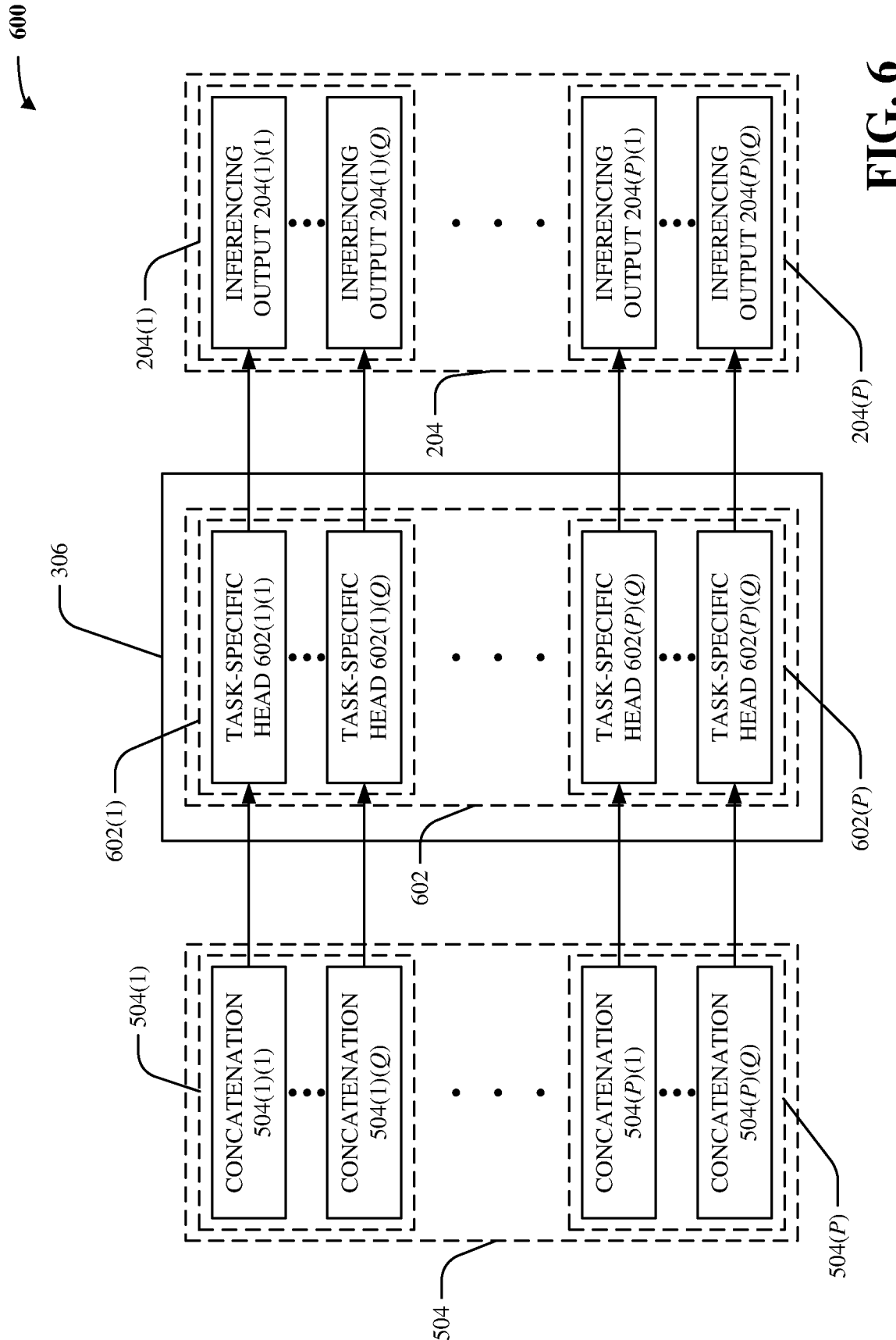
FIG. 6 illustrates an example, non-limiting block diagram of a head portion of a deep learning neural network in accordance with one or more embodiments described herein.

Various non-limiting aspects of the backbone portion 302, of the concatenation portion 304, and of the head portion 306 are described with respect to FIGS. 4-6.

FIG. 4 illustrates an example, non-limiting block diagram 400 of the backbone portion 302 of the deep learning neural network 202 in accordance with one or more embodiments described herein.

As shown, the backbone portion 302 can comprise a common backbone 402. In various aspects, the common backbone 402 can comprise any suitable numbers of any suitable types of neural network layers, arranged in any suitable fashion. For example, the common backbone 402 can comprise an input layer, any suitable number of hidden layers, and an output layer. In various instances, any of such layers can implement any suitable types of trainable internal parameters (e.g., any of such layers can be convolutional layers whose trainable internal parameters can be convolutional kernels; any of such layers can be dense layers whose trainable internal parameters can be weight matrices or bias values; any of such layers can be batch normalization layers whose trainable internal parameters can be shifting factors or scaling factors). In various cases, any of such layers can implement any suitable types of non-trainable internal parameters (e.g., any of such layers can be pooling layers, padding layers, or non-linearity layers, whose internal parameters can be considered as fixed or otherwise not trainable). Furthermore, in various aspects, the common backbone 402 can comprise any suitable number of any suitable types of interneuron connections or interlayer connections, such as forward connections, skip connections, or recurrent connections.

In various aspects, as shown, the backbone portion 302 can comprise a plurality of modality-specific backbones 404. In various instances, the plurality of modality-specific backbones 404 can comprise p backbones for any suitable positive integer p: a modality-specific backbone 404(1) to a modality-specific backbone 404(p). In various cases, a modality-specific backbone can comprise any suitable numbers of any suitable types of neural network layers, arranged in any suitable fashion. For example, a modality-specific backbone can comprise an input layer, any suitable number of hidden layers, and an output layer. In various aspects, any of such layers can implement any suitable types of trainable internal parameters (e.g., any of such layers can be convolutional layers whose trainable internal parameters can be convolutional kernels; any of such layers can be dense layers whose trainable internal parameters can be weight matrices or bias values; any of such layers can be batch normalization layers whose trainable internal parameters can be shifting factors or scaling factors). In various instances, any of such layers can implement any suitable types of non-trainable internal parameters (e.g., any of such layers can be pooling layers, padding layers, or non-linearity layers, whose internal parameters can be considered as fixed or otherwise not trainable). Moreover, in various cases, a modality-specific backbone can comprise any suitable number of any suitable types of interneuron connections or interlayer connections, such as forward connections, skip connections, or recurrent connections. In various aspects, different ones of the plurality of modality-specific backbones 404 can exhibit the same or different architectures as each other.

In various instances, as shown, the plurality of modality-specific backbones 404 can be in parallel (as opposed to in series) with the common backbone 402. That is, each of the plurality of modality-specific backbones 404 can be in parallel with the common backbone 402, and thus each of the plurality of modality-specific backbones 404 can be in parallel with every other of the plurality of modality-specific backbones 404. Furthermore, in various cases and as shown, the plurality of modality-specific backbones 404 can be isolated from the common backbone 402. In other words, for any given modality-specific backbone, there can be an absence of interneuron connections or interlayer connections between that given modality-specific backbone and the common backbone 402. Further still, in various aspects and as shown, the plurality of modality-specific backbones 404 can be isolated from each other. In other words, for any given modality-specific backbone, there can be an absence of interneuron connections or interlayer connections between that given modality-specific backbone and every other of the plurality of modality-specific backbones 404.

In various instances, the plurality of modality-specific backbones 404 can be considered as being collated by medical imaging modality. In other words, each of the plurality of modality-specific backbones 404 can be considered as being associated with a respective, unique medical imaging modality. As a non-limiting example, the modality-specific backbone 404(1) can be considered as being associated with a first medical imaging modality, meaning that the modality-specific backbone 404(1) can be configured to receive as input medical images generated or captured according to such first medical imaging modality (e.g., the modality-specific backbone 404(1) can be associated with a CT medical imaging modality, meaning that the modality-specific backbone 404(1) can be configured to receive as input CT scanned images). As another non-limiting example, the modality-specific backbone 404($p$) can be considered as being associated with a p-th medical imaging modality, meaning that the modality-specific backbone 404($p$) can be configured to receive as input medical images generated or captured according to such p-th medical imaging modality (e.g., the modality-specific backbone 404($p$) can be associated with a PET medical imaging modality, meaning that the modality-specific backbone 404($p$) can be configured to receive as input PET scanned images). In various instances, different ones of the plurality of modality-specific backbones 404 can be associated with different medical imaging modalities than each other.

In various aspects, as shown, the backbone portion 302 can comprise a plurality of task-specific backbones 406. In various instances, the plurality of task-specific backbones 406 can respectively correspond (e.g., in one-to-one fashion) to the plurality of inferencing tasks that are desired to be performed on the medical imaging data 104. That is, the plurality of task-specific backbones 406 can include one task-specific backbone per unique inferencing task. In various cases, a task-specific backbone can comprise any suitable numbers of any suitable types of neural network layers, arranged in any suitable fashion. For example, a task-specific backbone can comprise an input layer, any suitable number of hidden layers, and an output layer. In various aspects, any of such layers can implement any suitable types of trainable internal parameters (e.g., any of such layers can be convolutional layers whose trainable internal parameters can be convolutional kernels; any of such layers can be dense layers whose trainable internal parameters can be weight matrices or bias values; any of such layers can be batch normalization layers whose trainable internal parameters can be shifting factors or scaling factors). In various instances, any of such layers can implement any suitable types of non-trainable internal parameters (e.g., any of such layers can be pooling layers, padding layers, or non-linearity layers, whose internal parameters can be considered as fixed or otherwise not trainable). Moreover, in various cases, a task-specific backbone can comprise any suitable number of any suitable types of interneuron connections or interlayer connections, such as forward connections, skip connections, or recurrent connections. In various aspects, different ones of the plurality of task-specific backbones 406 can exhibit the same or different architectures as each other.

In various instances, as shown, the plurality of task-specific backbones 406 can be in parallel (as opposed to in series) with the common backbone 402 or with the plurality of modality-specific backbones 404. That is, each of the plurality of task-specific backbones 406 can be in parallel with the common backbone 402, and thus each of the plurality of task-specific backbones 406 can be in parallel with every other of the plurality of task-specific backbones 406 and with each of the plurality of modality-specific backbones 404. Furthermore, in various cases and as shown, the plurality of task-specific backbones 406 can be isolated from the common backbone 402. In other words, for any given task-specific backbone, there can be an absence of interneuron connections or interlayer connections between that given task-specific backbone and the common backbone 402. Further still, in various aspects and as shown, the plurality of task-specific backbones 406 can be isolated from each other. In other words, for any given task-specific backbone, there can be an absence of interneuron connections or interlayer connections between that given task-specific backbone and every other of the plurality of task-specific backbones 406. Even further still, in various instances and as shown, the plurality of task-specific backbones 406 can be isolated from the plurality of modality-specific backbones 404. In other words, for any given task-specific backbone and for any given modality-specific backbone, there can be an absence of interneuron connections or interlayer connections between them.

In various aspects, respective subsets of the plurality of task-specific backbones 406 can correspond to respective ones of the plurality of modality-specific backbones 404. In particular, as mentioned above, the plurality of modality-specific backbones 404 can be considered as being collated according to p medical imaging modalities (e.g., there can be p total modality-specific backbones, and each of such p total modality-specific backbones can be associated with a different or unique medical imaging modality). Accordingly, the plurality of task-specific backbones 406 can be considered as having p subsets: a subset 406(1) to a subset 406($p$). In various instances, each of such p subsets can have any suitable number of task-specific backbones. For example, the subset 406(1) can have q backbones for any suitable positive integer q: a task-specific backbone 406(1)(1) to a task-specific backbone 406(1)($q$). As another example, the subset 406($p$) can have q backbones for any suitable positive integer q: a task-specific backbone 406($p$)(1) to a task-specific backbone 406($p$)($q$).

In the non-limiting example of FIG. 4, there can be a total of (p)(q) task-specific backbones in the plurality of task-specific backbones 406. Accordingly, this can mean that it is desired to perform a total of (p)(q) inferencing tasks on the medical imaging data 104 (e.g., one task-specific backbone per inferencing task).

Although FIG. 4 depicts the subset 406(1) and the subset 406($p$) as having the same number of task-specific backbones (e.g., q) as each other, this is a mere non-limiting example for ease of illustration. In various cases, different ones of the p subsets of the plurality of task-specific backbones 406 can have the same or different numbers of task-specific backbones as each other.

In various aspects, each of such p subsets of the plurality of task-specific backbones 406 can be associated with a respective, unique medical imaging modality, since each of such p subsets and each of the plurality of modality-specific backbones 404 can be associated with a respective, unique medical imaging modality.

For example, as mentioned above, the modality-specific backbone 404(1) can be associated with a first medical imaging modality, meaning that the modality-specific backbone 404(1) can be configured to receive as input medical images generated or captured according to such first medical imaging modality. In various instances, the subset 406(1) can also be associated with that first medical imaging modality, meaning that each task-specific backbone in the subset 406(1) can be configured to receive as input medical images generated or captured according to such first medical imaging modality. Accordingly, the subset 406(1) (e.g., the task-specific backbone 406(1)(1) to the task-specific backbone 406(1)(q)) can be considered as corresponding to the modality-specific backbone 404(1), since they are all associated with the first medical imaging modality (e.g., if the modality-specific backbone 404(1) is configured to receive as input CT scanned images, then the task-specific backbone 406(1)(1) to the task-specific backbone 406(1)(q) can also be configured to receive as input CT scanned images).

As another example, the modality-specific backbone 404 (p) can, as mentioned above, be associated with a p-th medical imaging modality, meaning that the modality-specific backbone 404(p) can be configured to receive as input medical images generated or captured according to such p-th medical imaging modality. In various aspects, the subset 406(p) can also be associated with that p-th medical imaging modality, meaning that each task-specific backbone in the subset 406(p) can be configured to receive as input medical images generated or captured according to such p-th medical imaging modality. Accordingly, the subset 406(p) (e.g., the task-specific backbone 406(p)(1) to the task-specific backbone 406(p)(q)) can be considered as corresponding to the modality-specific backbone 404(p), since they are all associated with the p-th medical imaging modality (e.g., if the modality-specific backbone 404(p) is configured to receive as input PET scanned images, then the task-specific backbone 406(p)(1) to the task-specific backbone 406(p)(q) can also be configured to receive as input PET scanned images).

In various aspects, the common backbone 402 can receive as input the medical imaging data 104, and the common backbone 402 can produce as output a feature 408. More specifically, an input layer of the common backbone 402 can receive the medical imaging data 104, the medical imaging data 104 can complete a forward pass through one or more hidden layers of the common backbone 402, and an output layer of the common backbone 402 can compute the feature 408 based on activation maps generated by the one or more hidden layers of the common backbone 402. In any case, the feature 408 can be any suitable electronic data exhibiting any suitable format, size, or dimensionality. For example, the feature 408 can comprise one or more scalars, one or more vectors, one or more matrices, one or more tensors, one or more character strings, or any suitable combination thereof.

In various instances, the plurality of modality-specific backbones 404 can receive as input the medical imaging data 104 (or any suitable portion thereof), and the plurality of modality-specific backbones 404 can produce as output a plurality of features 410. In particular, for any given modality-specific backbone, the medical imaging data 104 (or any suitable portion thereof) can complete a forward pass through that given modality-specific backbone, which can cause that given modality-specific backbone to produce a respective one of the plurality of features 410. Thus, since the plurality of modality-specific backbones 404 can include p backbones, the plurality of features 410 can include p features: a feature 410(1) to a feature 410(p).

For example, the modality-specific backbone 404(1) can receive as input the medical imaging data 104 (or any suitable portion thereof), and the modality-specific backbone 404(1) can produce as output the feature 410(1). More specifically, an input layer of the modality-specific backbone 404(1) can receive the medical imaging data 104 (or any suitable portion thereof), the medical imaging data 104 (or any suitable portion thereof) can complete a forward pass through one or more hidden layers of the modality-specific backbone 404(1), and an output layer of the modality-specific backbone 404(1) can compute the feature 410(1) based on activation maps generated by the one or more hidden layers of the modality-specific backbone 404(1). In some instances, the modality-specific backbone 404(1) can receive as input an entirety of the medical imaging data 104. In other instances, the modality-specific backbone 404(1) can receive as input whatever portions of the medical imaging data 104 are associated with a same medical imaging modality as the modality-specific backbone 404(1) (e.g., if the modality-specific backbone 404(1) is associated with a CT medical imaging modality, then the modality-specific backbone 404(1) can receive one or more CT scanned images in the medical imaging data 104). In any case, the feature 410(1) can be any suitable electronic data exhibiting any suitable format, size, or dimensionality. For example, the feature 410(1) can comprise one or more scalars, one or more vectors, one or more matrices, one or more tensors, one or more character strings, or any suitable combination thereof.

As another example, the modality-specific backbone 404 (p) can receive as input the medical imaging data 104 (or any suitable portion thereof), and the modality-specific backbone 404(p) can produce as output the feature 410(p). In particular, an input layer of the modality-specific backbone 404(p) can receive the medical imaging data 104 (or any suitable portion thereof), the medical imaging data 104 (or any suitable portion thereof) can complete a forward pass through one or more hidden layers of the modality-specific backbone 404(p), and an output layer of the modality-specific backbone 404(p) can compute the feature 410(p) based on activation maps generated by the one or more hidden layers of the modality-specific backbone 404(p). In some aspects, the modality-specific backbone 404(p) can receive as input an entirety of the medical imaging data 104. In other aspects, the modality-specific backbone 404(p) can receive as input whatever portions of the medical imaging data 104 are associated with a same medical imaging modality as the modality-specific backbone 404(p) (e.g., if the modality-specific backbone 404(p) is associated with a PET medical imaging modality, then the modality-specific backbone 404(p) can receive one or more PET scanned images in the medical imaging data 104). In any case, the feature 410(p) can be any suitable electronic data exhibiting any suitable format, size, or dimensionality. For example, the feature 410(p) can comprise one or more scalars, one or more vectors, one or more matrices, one or more tensors, one or more character strings, or any suitable combination thereof.

In various instances, different ones of the plurality of features 410 can have the same or different formats, sizes, or dimensionalities as each other.

In various aspects, the plurality of task-specific backbones 406 can receive as input the medical imaging data 104 (or any suitable portion thereof), and the plurality of task-specific backbones 406 can produce as output a plurality of features 412. In particular, for any given task-specific backbone, the medical imaging data 104 (or any suitable portion thereof) can complete a forward pass through that given task-specific backbone, which can cause that given task-specific backbone to produce a respective one of the plurality of features 412.

For example, the task-specific backbone 406(1)(1) can receive as input the medical imaging data 104 (or any suitable portion thereof), and the task-specific backbone 406(1)(1) can produce as output a feature 412(1)(1). More specifically, an input layer of the task-specific backbone 406(1)(1) can receive the medical imaging data 104 (or any suitable portion thereof), the medical imaging data 104 (or any suitable portion thereof) can complete a forward pass through one or more hidden layers of the task-specific backbone 406(1)(1), and an output layer of the task-specific backbone 406(1)(1) can compute the feature 412(1)(1) based on activation maps generated by the one or more hidden layers of the task-specific backbone 406(1)(1). In some instances, the task-specific backbone 406(1)(1) can receive as input an entirety of the medical imaging data 104. In other instances, the task-specific backbone 406(1)(1) can receive as input whatever portions of the medical imaging data 104 are associated with a same medical imaging modality as the task-specific backbone 406(1)(1) (e.g., if the task-specific backbone 406(1)(1) is associated with a CT medical imaging modality, then the task-specific backbone 406(1)(1) can receive one or more CT scanned images in the medical imaging data 104). In any case, the feature 412(1)(1) can be any suitable electronic data exhibiting any suitable format, size, or dimensionality. That is, the feature 412(1)(1) can comprise one or more scalars, one or more vectors, one or more matrices, one or more tensors, one or more character strings, or any suitable combination thereof.

As another example, the task-specific backbone 406(1)($q$) can receive as input the medical imaging data 104 (or any suitable portion thereof), and the task-specific backbone 406(1)($q$) can produce as output a feature 412(1)($q$). In particular, an input layer of the task-specific backbone 406(1)($q$) can receive the medical imaging data 104 (or any suitable portion thereof), the medical imaging data 104 (or any suitable portion thereof) can complete a forward pass through one or more hidden layers of the task-specific backbone 406(1)($q$), and an output layer of the task-specific backbone 406(1)($q$) can compute the feature 412(1)($q$) based on activation maps generated by the one or more hidden layers of the task-specific backbone 406(1)($q$). In some aspects, just as above, the task-specific backbone 406(1)($q$) can receive as input an entirety of the medical imaging data 104. In other aspects, the task-specific backbone 406(1)($q$) can receive as input whatever portions of the medical imaging data 104 are associated with a same medical imaging modality as the task-specific backbone 406(1)($q$) (e.g., if the task-specific backbone 406(1)($q$) is associated with a CT medical imaging modality, then the task-specific backbone 406(1)($q$) can receive one or more CT scanned images in the medical imaging data 104). In any case, the feature 412(1)($q$) can be any suitable electronic data exhibiting any suitable format, size, or dimensionality (e.g., the feature 412(1)(1) can comprise one or more scalars, one or more vectors, one or more matrices, one or more tensors, one or more character strings, or any suitable combination thereof).

As yet another example, the task-specific backbone 406($p$)(1) can receive as input the medical imaging data 104 (or any suitable portion thereof), and the task-specific backbone 406($p$)(1) can produce as output a feature 412($p$)(1). For instance, an input layer of the task-specific backbone 406($p$)(1) can receive the medical imaging data 104 (or any suitable portion thereof), the medical imaging data 104 (or any suitable portion thereof) can complete a forward pass through one or more hidden layers of the task-specific backbone 406($p$)(1), and an output layer of the task-specific backbone 406($p$)(1) can compute the feature 412($p$)(1) based on activation maps generated by the one or more hidden layers of the task-specific backbone 406($p$)(1). In some aspects, the task-specific backbone 406($p$)(1) can receive as input an entirety of the medical imaging data 104. In other aspects, the task-specific backbone 406($p$)(1) can receive as input whatever portions of the medical imaging data 104 are associated with a same medical imaging modality as the task-specific backbone 406($p$)(1) (e.g., if the task-specific backbone 406($p$)(1) is associated with a PET medical imaging modality, then the task-specific backbone 406($p$)(1) can receive one or more PET scanned images in the medical imaging data 104). In any case, the feature 412($p$)(1) can be any suitable electronic data exhibiting any suitable format, size, or dimensionality (e.g., the feature 412($p$)(1) can comprise one or more scalars, one or more vectors, one or more matrices, one or more tensors, one or more character strings, or any suitable combination thereof).

As even another example, the task-specific backbone 406($p$)($q$) can receive as input the medical imaging data 104 (or any suitable portion thereof), and the task-specific backbone 406($p$)($q$) can produce as output a feature 412($p$)($q$). For instance, an input layer of the task-specific backbone 406($p$)($q$) can receive the medical imaging data 104 (or any suitable portion thereof), the medical imaging data 104 (or any suitable portion thereof) can complete a forward pass through one or more hidden layers of the task-specific backbone 406($p$)($q$), and an output layer of the task-specific backbone 406($p$)($q$) can compute the feature 412($p$)($q$) based on activation maps generated by the one or more hidden layers of the task-specific backbone 406($p$)($q$). In some instances, the task-specific backbone 406($p$)($q$) can receive as input an entirety of the medical imaging data 104. In other instances, the task-specific backbone 406($p$)($q$) can receive as input whatever portions of the medical imaging data 104 are associated with a same medical imaging modality as the task-specific backbone 406($p$)($q$) (e.g., if the task-specific backbone 406($p$)($q$) is associated with a PET medical imaging modality, then the task-specific backbone 406($p$)($q$) can receive one or more PET scanned images in the medical imaging data 104). In any case, the feature 412($p$)($q$) can be any suitable electronic data exhibiting any suitable format, size, or dimensionality (e.g., the feature 412($p$)($q$) can comprise one or more scalars, one or more vectors, one or more matrices, one or more tensors, one or more character strings, or any suitable combination thereof).

In various cases, the feature 412(1)(1) to the feature 412(1)($q$) can collectively be considered as a subset 412(1) of the plurality of features 412 (e.g., the subset 412(1) can be generated by the subset 406(1)). Likewise, in various instances, the feature 412($p$)(1) to the feature 412($p$)($q$) can collectively be considered as a subset 412($p$) of the plurality of features 412 (e.g., the subset 412($p$) can be generated by the subset 406($p$)).

Note that, because the plurality of modality-specific backbones 404 can be in parallel with the common backbone 402, the plurality of modality-specific backbones 404 can generate the plurality of features 410 simultaneously or otherwise in chronologically overlapping fashion as the common backbone 402 generates the feature 408. Likewise, because the plurality of task-specific backbones 406 can be in parallel with the common backbone 402, the plurality of task-specific backbones 406 can generate the plurality of features 412 simultaneously or otherwise in chronologically overlapping fashion as the common backbone 402 generates the feature 408.

FIG. 5 illustrates an example, non-limiting block diagram 500 of the concatenation portion 304 of the deep learning neural network 202 in accordance with one or more embodiments described herein.

In various aspects, the concatenation portion 304 can comprise a plurality of concatenation layers 502. In various instances, the plurality of concatenation layers 502 can respectively correspond (e.g., in one-to-one fashion) to the plurality of task-specific backbones 406. In particular, the plurality of concatenation layers 502 can be respectively in series with the plurality of task-specific backbones 406. In other words, for any given task-specific backbone, a respective one of the plurality of concatenation layers 502 can be downstream of and in series with that given task-specific backbone. For example, a concatenation layer 502(1)(1) can be downstream of and in series with the task-specific backbone 406(1)(1). As another example, a concatenation layer 502(1)(q) can be downstream of and in series with the task-specific backbone 406(1)(q). As yet another example, a concatenation layer 502(p)(1) can be downstream of and in series with the task-specific backbone 406(p)(1). As still another example, a concatenation layer 502(p)(q) can be downstream of and in series with the task-specific backbone 406(p)(q).

In various cases, the concatenation layer 502(1)(1) to the concatenation layer 502(1)(q) can collectively be considered as a subset 502(1) of the plurality of concatenation layers 502 (e.g., the subset 502(1) can be respectively in series with the subset 406(1)). Likewise, in various instances, the concatenation layer 502(p)(1) to the concatenation layer 502(p)(q) can collectively be considered as a subset 502(p) of the plurality of concatenation layers 502 (e.g., the subset 502(p) can be respectively in series with the subset 406(p)).

In any case, a concatenation layer can be any suitable neural network layer that can concatenate two or more inputs together.

In various aspects, respective ones of the plurality of concatenation layers 502 can concatenate respective ones of the plurality of features 412 together with respective ones of the plurality of features 410 or together with the feature 408, thereby yielding a plurality of concatenations 504. More specifically, for any given concatenation layer, that given concatenation layer can be in series with a respective task-specific backbone, and that respective task-specific backbone can correspond to a respective modality-specific backbone. Accordingly, such given concatenation layer can receive as input whichever of the plurality of features 412 was generated by that respective task-specific backbone, whichever of the plurality of features 410 was generated by that respective modality-specific backbone, and the feature 408 that was generated by the common backbone 402, and such given concatenation layer can generate a respective one of the plurality of concatenations 504 based on such inputs.

For example, the concatenation layer 502(1)(1) can be in series with the task-specific backbone 406(1)(1), and the task-specific backbone 406(1)(1) can correspond to the modality-specific backbone 404(1). Accordingly, the concatenation layer 502(1)(1) can receive as input: the feature 412(1)(1) that was generated by the task-specific backbone 406(1)(1); the feature 410(1) that was generated by the modality-specific backbone 404(1); and the feature 408 that was generated by the common backbone 402. In various cases, the concatenation layer 502(1)(1) can concatenate such inputs together (e.g., can concatenate the feature 412(1)(1) with the feature 410(1) and with the feature 408), thereby yielding a concatenation 504(1)(1).

As another example, the concatenation layer 502(1)(q) can be in series with the task-specific backbone 406(1)(q), and the task-specific backbone 406(1)(q) can correspond to the modality-specific backbone 404(1). Thus, the concatenation layer 502(1)(q) can receive as input: the feature 412(1)(q) that was generated by the task-specific backbone 406(1)(q); the feature 410(1) that was generated by the modality-specific backbone 404(1); and the feature 408 that was generated by the common backbone 402. In various instances, the concatenation layer 502(1)(q) can concatenate such inputs together (e.g., can concatenate the feature 412(1)(q) with the feature 410(1) and with the feature 408), thereby yielding a concatenation 504(1)(q).

As even another example, the concatenation layer 502(p)(1) can be in series with the task-specific backbone 406(p)(1), and the task-specific backbone 406(p)(1) can correspond to the modality-specific backbone 404(p). Accordingly, the concatenation layer 502(p)(1) can receive as input: the feature 412(p)(1) that was generated by the task-specific backbone 406(p)(1); the feature 410(p) that was generated by the modality-specific backbone 404(p); and the feature 408 that was generated by the common backbone 402. In various cases, the concatenation layer 502(p)(1) can concatenate such inputs together (e.g., can concatenate the feature 412(p)(1) with the feature 410(p) and with the feature 408), thereby yielding a concatenation 504(p)(1).

As still another example, the concatenation layer 502(p)(q) can be in series with the task-specific backbone 406(p)(q), and the task-specific backbone 406(p)(q) can correspond to the modality-specific backbone 404(p). Accordingly, the concatenation layer 502(p)(q) can receive as input: the feature 412(p)(q) that was generated by the task-specific backbone 406(p)(q); the feature 410(p) that was generated by the modality-specific backbone 404(p); and the feature 408 that was generated by the common backbone 402. In various cases, the concatenation layer 502(p)(q) can concatenate such inputs together (e.g., can concatenate the feature 412(p)(q) with the feature 410(p) and with the feature 408), thereby yielding a concatenation 504(p)(q).

In various cases, the concatenation 504(1)(1) to the concatenation 504(1)(q) can collectively be considered as a subset 504(1) of the plurality of concatenations 504 (e.g., the subset 504(1) can be respectively generated by the subset 502(1)). Likewise, in various instances, the concatenation 504(p)(1) to the concatenation 504(p)(q) can collectively be considered as a subset 504(p) of the plurality of concatenations 504 (e.g., the subset 504(p) can be respectively generated by the subset 502(p)).

It should be appreciated that the concatenation paths shown in FIG. 5 are mere non-limiting examples. In various aspects, any other suitable concatenation paths can be implemented. That is, in various instances, a concatenation layer in the plurality of concatenation layers 502 can concatenate one or more of the plurality of features 412 with one or more of the plurality of features 410 or with the feature 408.

Furthermore, it should be appreciated that the concatenation portion 304 of the deep learning neural network 202 is a mere non-limiting example. In various aspects, the concatenation portion 304 can be more generally considered as a "combination portion" that can combine, in any suitable fashions, various outputs produced by the backbone portions 302. In such case, rather than comprising the plurality of concatenation layers 502, such combination portion could be more generally considered as comprising a plurality of combination layers.

As a non-limiting example, the concatenation layer 502 (1)(1) could instead be considered more generally as a "combination" layer 502(1)(1), and the concatenation 504 (1)(1) can instead be considered more generally as a "combination" 504(1)(1). In such case, the "combination" layer 502(1)(1) can combine the feature 412(1)(1) with the feature 410(1) and with the feature 408 in any suitable fashion. In some cases, this can be facilitated via concatenation, as described above. However, in other cases, this can be facilitated without concatenation. For instance, in some aspects, the "combination" layer 502(1)(1) can project, via any suitable dimensionality reduction or projection techniques, the feature 412(1)(1), the feature 410(1), and the feature 408 into a same dimensional space as each other, and the "combination" layer 502(1)(1) can sum such projections together, thereby yielding the "combination" 504(1)(1).

As another non-limiting example, the concatenation layer 502(1)(q) could instead be considered more generally as a "combination" layer 502(1)(q), and the concatenation 504 (1)(q) can instead be considered more generally as a "combination" 504(1)(q). In such case, the "combination" layer 502(1)(q) can combine the feature 412(1)(q) with the feature 410(1) and with the feature 408 in any suitable fashion. In some cases, this can be facilitated via concatenation, as described above. However, in other cases, this can be facilitated without concatenation. For instance, in some aspects, the "combination" layer 502(1)(q) can project, via any suitable dimensionality reduction or projection techniques, the feature 412(1)(q), the feature 410(1), and the feature 408 into a same dimensional space as each other, and the "combination" layer 502(1)(q) can sum such projections together, thereby yielding the "combination" 504(1)(q).

As yet non-limiting example, the concatenation layer 502(p)(1) could instead be considered more generally as a "combination" layer 502(p)(1), and the concatenation 504 (p)(1) can instead be considered more generally as a "combination" 504(p)(1). In such case, the "combination" layer 502(p)(1) can combine the feature 412(p)(1) with the feature 410(p) and with the feature 408 in any suitable fashion. In some cases, this can be facilitated via concatenation, as described above. However, in other cases, this can be facilitated without concatenation. For instance, in some aspects, the "combination" layer 502(p)(1) can project, via any suitable dimensionality reduction or projection techniques, the feature 412(p)(1), the feature 410(p), and the feature 408 into a same dimensional space as each other, and the "combination" layer 502(p)(1) can sum such projections together, thereby yielding the "combination" 504(p)(1).

As still non-limiting example, the concatenation layer 502(p)(q) could instead be considered more generally as a "combination" layer 502(p)(q), and the concatenation 504 (p)(q) can instead be considered more generally as a "combination" 504(p)(q). In such case, the "combination" layer 502(p)(q) can combine the feature 412(p)(q) with the feature 410(p) and with the feature 408 in any suitable fashion. In some cases, this can be facilitated via concatenation, as described above. However, in other cases, this can be facilitated without concatenation. For instance, in some aspects, the "combination" layer 502(p)(q) can project, via any suitable dimensionality reduction or projection techniques, the feature 412(p)(q), the feature 410(p), and the feature 408 into a same dimensional space as each other, and the "combination" layer 502(p)(q) can sum such projections together, thereby yielding the "combination" 504(p)(q).

That is, in various embodiments, the outputs (e.g., 408, 410, 412) of the backbone portion 302 can be combined in any suitable fashions (e.g., are not limited to being combined solely via concatenations).

FIG. 6 illustrates an example, non-limiting block diagram 600 of the head portion 306 of the deep learning neural network 202 in accordance with one or more embodiments described herein.

In various aspects, the head portion 306 can comprise a plurality of task-specific heads 602. In various instances, the plurality of task-specific heads 602 can respectively correspond (e.g., in one-to-one fashion) to the plurality of concatenation layers 502. In particular, the plurality of task-specific heads 602 can be respectively in series with the plurality of concatenation layers 502. In other words, for any given concatenation layer, a respective one of the plurality of task-specific heads 602 can be downstream of and in series with that given concatenation layer. For example, a task-specific head 602(1)(1) can be downstream of and in series with the concatenation layer 502(1)(1). As another example, a task-specific head 602(1)(q) can be downstream of and in series with the concatenation layer 502(1)(q). As yet another example, a task-specific head 602(p)(1) can be downstream of and in series with the concatenation layer 502(p)(1). As still another example, a task-specific head 602(p)(q) can be downstream of and in series with the concatenation layer 502(p)(q).

In various cases, the task-specific head 602(1)(1) to the task-specific head 602(1)(q) can collectively be considered as a subset 602(1) of the plurality of task-specific heads 602 (e.g., the subset 602(1) can be respectively in series with the subset 502(1)). Likewise, in various instances, the task-specific head 602(p)(1) to the task-specific head 602(p)(q) can collectively be considered as a subset 602(p) of the plurality of task-specific heads 602 (e.g., the subset 602(p) can be respectively in series with the subset 502(p)).

In various aspects, a task-specific head can comprise any suitable numbers of any suitable types of neural network layers, arranged in any suitable fashion. For example, a task-specific head can comprise an input layer, any suitable number of hidden layers, and an output layer. In various instances, any of such layers can implement any suitable types of trainable internal parameters (e.g., any of such layers can be convolutional layers whose trainable internal parameters can be convolutional kernels; any of such layers can be dense layers whose trainable internal parameters can be weight matrices or bias values; any of such layers can be batch normalization layers whose trainable internal parameters can be shifting factors or scaling factors). In various cases, any of such layers can implement any suitable types of non-trainable internal parameters (e.g., any of such layers can be pooling layers, padding layers, or non-linearity layers, whose internal parameters can be considered as fixed or otherwise not trainable). Moreover, in various aspects, a task-specific head can comprise any suitable number of any suitable types of interneuron connections or interlayer connections, such as forward connections, skip connections, or recurrent connections. In various instances, different ones of the plurality of task-specific heads 602 can exhibit the same or different architectures as each other.

In various aspects, the plurality of task-specific heads 602 can generate the plurality of inferencing outputs 204 based on the plurality of concatenations 504. More specifically, for any given task-specific head, that given task-specific head can be in series with a respective concatenation layer. Accordingly, such given task-specific head can receive as input whichever of the plurality of concatenations 504 was generated by that respective concatenation layer, and such given task-specific head can generate a respective one of the plurality of inferencing outputs 204 based on such concatenation.

For example, the task-specific head 602(1)(1) can be in series with the concatenation layer 502(1)(1), and the concatenation layer 502(1)(1) can generate the concatenation 504(1)(1). Thus, the task-specific head 602(1)(1) can receive as input the concatenation 504(1)(1) and can produce an inferencing output 204(1)(1). In particular, an input layer of the task-specific head 602(1)(1) can receive the concatenation 504(1)(1), the concatenation 504(1)(1) can complete a forward pass through one or more hidden layers of the task-specific head 602(1)(1), and an output layer of the task-specific head 602(1)(1) can compute the inferencing output 204(1)(1) based on activation maps generated by the one or more hidden layers of the task-specific head 602(1) (1).

As another example, the task-specific head 602(1)(q) can be in series with the concatenation layer 502(1)(q), and the concatenation layer 502(1)(q) can generate the concatenation 504(1)(q). Thus, the task-specific head 602(1)(q) can receive as input the concatenation 504(1)(q) and can produce an inferencing output 204(1)(q). More specifically, an input layer of the task-specific head 602(1)(q) can receive the concatenation 504(1)(q), the concatenation 504(1)(q) can complete a forward pass through one or more hidden layers of the task-specific head 602(1)(q), and an output layer of the task-specific head 602(1)(q) can compute the inferencing output 204(1)(q) based on activation maps generated by the one or more hidden layers of the task-specific head 602(1)(q).

As still another example, the task-specific head 602(p)(1) can be in series with the concatenation layer 502(p)(1), and the concatenation layer 502(p)(1) can generate the concatenation 504(p)(1). Thus, the task-specific head 602(p)(1) can receive as input the concatenation 504(p)(1) and can produce an inferencing output 204(p)(1). That is, an input layer of the task-specific head 602(p)(1) can receive the concatenation 504(p)(1), the concatenation 504(p)(1) can complete a forward pass through one or more hidden layers of the task-specific head 602(p)(1), and an output layer of the task-specific head 602(p)(1) can compute the inferencing output 204(p)(1) based on activation maps generated by the one or more hidden layers of the task-specific head 602(p) (1).

As even another example, the task-specific head 602(p)(q) can be in series with the concatenation layer 502(p)(q), and the concatenation layer 502(p)(q) can generate the concatenation 504(p)(q). So, the task-specific head 602(p)(q) can receive as input the concatenation 504(p)(q) and can produce an inferencing output 204(p)(q). In other words, an input layer of the task-specific head 602(p)(q) can receive the concatenation 504(p)(q), the concatenation 504(p)(q) can complete a forward pass through one or more hidden layers of the task-specific head 602(p)(q), and an output layer of the task-specific head 602(p)(q) can compute the inferencing output 204(p)(q) based on activation maps generated by the one or more hidden layers of the task-specific head 602(p)(q).

In various cases, the inferencing output 204(1)(1) to the inferencing output 204(1)(q) can collectively be considered as a subset 204(1) of the plurality of inferencing outputs 204 (e.g., the subset 204(1) can be respectively generated by the subset 602(1)). Likewise, in various instances, the inferencing output 204(p)(1) to the inferencing output 204(p)(q) can collectively be considered as a subset 204(p) of the plurality of inferencing outputs 204 (e.g., the subset 204(p) can be respectively generated by the subset 602(p)).

Although not explicitly shown in FIGS. 4-6, the deep learning neural network 202 can comprise any suitable gating layers that can determine or otherwise control which of the plurality of modality-specific backbones 404, which of the plurality of task-specific backbones 406, which of the plurality of concatenation layers 502, or which of the plurality of task-specific heads 602 are activated during any given forward pass.

For example, as described herein, the medical imaging data 104 can complete a forward pass through the deep learning neural network 202, thereby yielding the plurality of inferencing outputs 204. During such forward pass, the medical imaging data 104 (or any suitable portions thereof) can, as mentioned above, be analyzed by the plurality of modality-specific backbones 404. However, in some cases, the medical imaging data 104 (or any suitable portions thereof) can be analyzed by fewer than all of the plurality of modality-specific backbones 404. In particular, any suitable neural network gating layer can be in parallel with the plurality of modality-specific backbones 404, and such neural network gating layer can determine or otherwise control which of the plurality of modality-specific backbones 404 should receive the medical imaging data 104 (or any suitable portions thereof) and which of the plurality of modality-specific backbones 404 should not.

As another example, as described herein, the medical imaging data 104 can complete a forward pass through the deep learning neural network 202, thereby yielding the plurality of inferencing outputs 204. During such forward pass, the medical imaging data 104 (or any suitable portions thereof) can, as mentioned above, be analyzed by the plurality of task-specific backbones 406. However, in some cases, the medical imaging data 104 (or any suitable portions thereof) can be analyzed by fewer than all of the plurality of task-specific backbones 406. In particular, any suitable neural network gating layer can be in parallel with the plurality of task-specific backbones 406, and such neural network gating layer can determine or otherwise control which of the plurality of task-specific backbones 406 should receive the medical imaging data 104 (or any suitable portions thereof) and which of the plurality of task-specific backbones 406 should not.

As still another example, as described herein, the medical imaging data 104 can complete a forward pass through the deep learning neural network 202, thereby yielding the plurality of inferencing outputs 204. During such forward pass, the medical imaging data 104 (or any suitable portions thereof) can, as mentioned above, be analyzed by the plurality of concatenation layers 502. However, in some cases, the medical imaging data 104 (or any suitable portions thereof) can be analyzed by fewer than all of the plurality of concatenation layers 502. More specifically, any suitable neural network gating layer can be in parallel with the plurality of concatenation layers 502, and such neural network gating layer can determine or otherwise control which of the plurality of concatenation layers 502 should receive the medical imaging data 104 (or any suitable portions thereof) and which of the plurality of concatenation layers 502 should not.

As yet another example, as described herein, the medical imaging data 104 can complete a forward pass through the deep learning neural network 202, thereby yielding the plurality of inferencing outputs 204. During such forward pass, the medical imaging data 104 (or any suitable portions thereof) can, as mentioned above, be analyzed by the plurality of task-specific heads 602. However, in some cases, the medical imaging data 104 (or any suitable portions thereof) can be analyzed by fewer than all of the plurality of task-specific heads 602. More specifically, any suitable neural network gating layer can be in parallel with the plurality of task-specific heads 602, and such neural network gating layer can determine or otherwise control which of the plurality of task-specific heads 602 should receive the medical imaging data 104 (or any suitable portions thereof) and which of the plurality of task-specific heads 602 should not.

In this way, any suitable gating layers can be implemented to dynamically change which portions of the deep learning neural network 202 (e.g., which of the plurality of modality-specific backbones 404, which of the plurality of task-specific backbones 406, which of the plurality of concat-enation layers 502, or which of the plurality of task-specific heads 602) can be executed during any suitable forward pass.

In any case, the inference component 112 can execute the deep learning neural network 202 on the medical imaging data 104, thereby yielding the plurality of inferencing outputs 204.

Referring back to FIG. 2, the result component 114 can, in various embodiments, initiate any suitable electronic actions based on the plurality of inferencing outputs 204. As a non-limiting example, the result component 114 can electronically transmit one or more of the plurality of inferencing outputs 204 to any suitable computing device (not shown), so as to notify a user or technician that such one or more of the plurality of inferencing outputs 204 have been generated. As another non-limiting example, the result component 114 can electronically render one or more of the plurality of inferencing outputs 204 on any suitable computer screen, computer monitor, computer display, or graphical user-interface (not shown), so as to allow a user or technician to visually inspect such one or more of the plurality of inferencing outputs 204. As a non-limiting example, such computer screen, computer monitor, computer display, or graphical user-interface can be integrated into or otherwise associated with whatever medical imaging devices that generated the medical imaging data 104.

To help ensure that the plurality of inferencing outputs 204 are accurate, the deep learning neural network 202 can first undergo training. Various non-limiting aspects of such training are described with respect to FIGS. 7-14.

Figure 7:
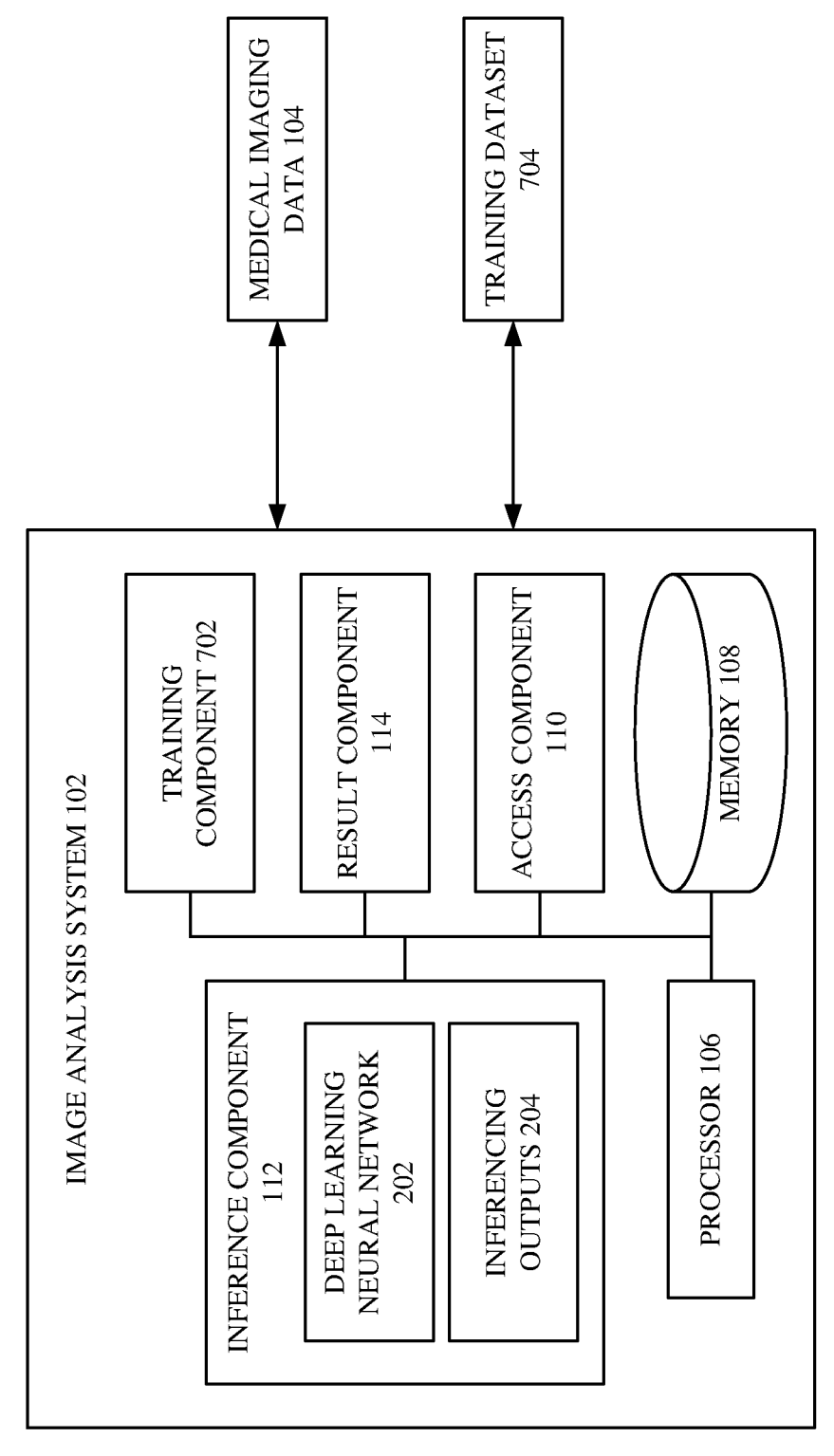
FIG. 7 illustrates a block diagram of an example, non-limiting system including a training component and a training dataset that facilitates deep learning image analysis with increased modularity and reduced footprint in accordance with one or more embodiments described herein.

FIG. 7 illustrates a block diagram of an example, non-limiting system 700 including a training component and a training dataset that can facilitate deep learning image analysis with increased modularity and reduced footprint in accordance with one or more embodiments described herein. As shown, the system 700 can, in some cases, comprise the same components as the system 200, and can further comprise a training component 702 or a training dataset 704.

In various embodiments, the access component 110 can electronically receive, retrieve, obtain, or otherwise access, from any suitable source, the training dataset 704. In various aspects, the training component 702 can train the deep learning neural network 202 based on the training dataset

704. Various non-limiting aspects of such training are described with respect to FIGS. 8-14.

Figure 8:
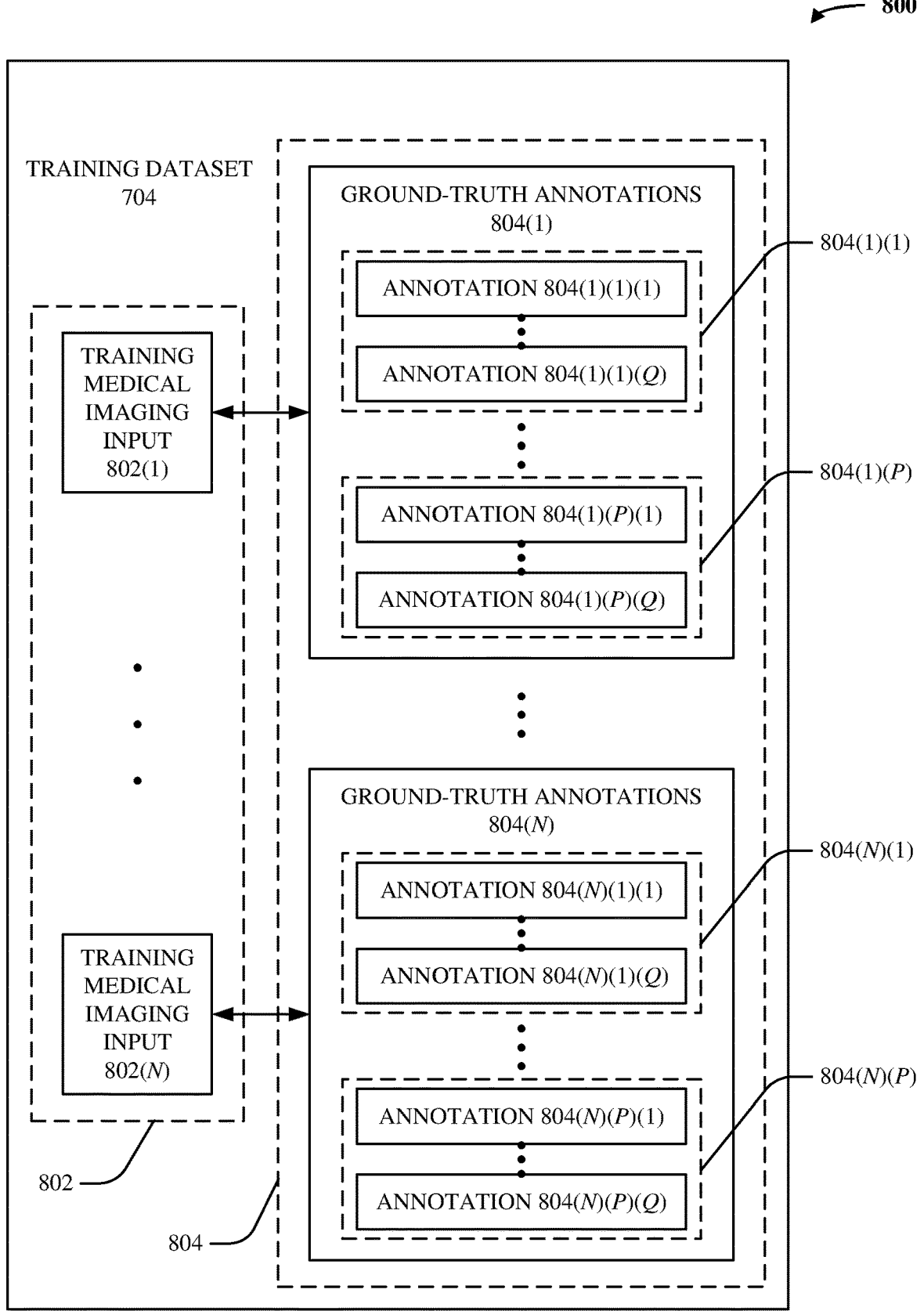
FIG. 8 illustrates an example, non-limiting block diagram of a training dataset in accordance with one or more embodiments described herein.

FIG. 8 illustrates a block diagram 800 showing an example, non-limiting embodiment of the training dataset 704 in accordance with one or more embodiments described herein. In various aspects, as shown, the training dataset 704 can comprise a set of training medical imaging inputs 802 and a set of pluralities of ground-truth annotations 804.

In various instances, the set of training medical imaging inputs 802 can include n inputs for any suitable positive integer n: a training medical imaging input 802(1) to a training medical imaging input 802($n$). In various cases, a training medical imaging input can be any suitable electronic data that has the same format, size, or dimensionality as the medical imaging data 104. For example, if the medical imaging data 104 includes a CT scanned image, an MRI scanned image, and an X-ray scanned image of an anatomical structure of a medical image patient, then each training medical imaging input can likewise include a CT scanned image, an MRI scanned image, and an X-ray scanned image of a respective anatomical structure of a respective medical patient.

In various aspects, the set of pluralities of ground-truth annotations 804 can respectively correspond (e.g., in one-to-one fashion) to the set of training medical imaging inputs 802. Thus, since the set of training medical imaging inputs 802 can have n inputs, the set of pluralities of ground-truth annotations 804 can have n pluralities: a plurality of ground-truth annotations 804(1) to a plurality of ground-truth anno-tations 804($n$). In various instances, each plurality of ground-truth annotations can be any suitable electronic data that represent or indicate inferencing outputs that would be achieved if the plurality of inferencing tasks were correctly or accurately performed on a respective training medical imaging input.

For example, the plurality of ground-truth annotations 804(1) can correspond to the training medical imaging input 802(1). Recall that, as mentioned above, it can be desired that the deep learning neural network 202 perform a total of $(p)(q)$ inferencing tasks on inputted medical imaging data. Accordingly, the plurality of ground-truth annotations 804 (1) can be considered as representing or indicating a total of $(p)(q)$ inferencing results that would be obtained if each of those $(p)(q)$ inferencing tasks were accurately or correctly performed on the training medical imaging input 802(1). In other words, the plurality of ground-truth annotations 804(1) can be considered as representing or indicating ground-truth results that should be outputted by the plurality of task-specific heads 602 in response to the deep learning neural network 202 being executed on the training medical imaging input 802(1). In particular, the plurality of ground-truth annotations 804(1) can include an annotation 804(1)(1)(1), where the annotation 804(1)(1)(1) can be considered as a ground-truth result that should be outputted by the task-specific head 602(1)(1) if the deep learning neural network 202 were executed on the training medical imaging input 802(1). Likewise, the plurality of ground-truth annotations 804(1) can include an annotation 804(1)(1)($q$), where the annotation 804(1)(1)($q$) can be considered as a ground-truth result that should be outputted by the task-specific head 602(1)($q$) if the deep learning neural network 202 were executed on the training medical imaging input 802(1). Furthermore, the plurality of ground-truth annotations 804 (1) can include an annotation 804(1)($p$)(1), where the anno-tation 804(1)($p$)(1) can be considered as a ground-truth result that should be outputted by the task-specific head 602($p$)(1) if the deep learning neural network 202 were executed on the training medical imaging input 802(1). Further still, the plurality of ground-truth annotations 804(1) can include an annotation 804(1)(p)(q), where the annotation 804(1)(p)(q) can be considered as a ground-truth result that should be outputted by the task-specific head 602(p)(q) if the deep learning neural network 202 were executed on the training medical imaging input 802(1).

In various cases, the annotation 804(1)(1)(1) to the annotation 804(1)(1)(q) can collectively be considered as a subset 804(1)(1) of the plurality of ground-truth annotations 804 (1). Likewise, in various instances, the annotation 804(1) (p)(1) to the annotation 804(1)(p)(q) can collectively be considered as a subset 804(1)(p) of the plurality of ground-truth annotations 804(1).

In various aspects, each annotation of the plurality of ground-truth annotations 804(1) can be crafted manually by technicians based on the training medical imaging input 802(1). In various other aspects, each of the plurality of ground-truth annotations 804(1) can be generated by a respective pre-trained teacher network. In particular, there can be a total of (p)(q) teacher networks, each being pre-trained to perform a respective one of the total of (p)(q) inferencing tasks on inputted medical images. Thus, each of such total of (p)(q) teacher networks can be independently executed on the training medical imaging input 802(1), thereby yielding a respective output, and such respective output can be considered or treated as one of the plurality of ground-truth annotations 804(1).

As another example, the plurality of ground-truth annotations 804(n) can correspond to the training medical imaging input 802(n). Again, as mentioned above, it can be desired that the deep learning neural network 202 perform a total of (p)(q) inferencing tasks on inputted medical imaging data. So, the plurality of ground-truth annotations 804(n) can be considered as representing or indicating a total of (p)(q) inferencing results that would be obtained if each of those (p)(q) inferencing tasks were accurately or correctly performed on the training medical imaging input 802(n). That is, the plurality of ground-truth annotations 804(n) can be considered as representing or indicating ground-truth results that should be outputted by the plurality of task-specific heads 602 in response to the deep learning neural network 202 being executed on the training medical imaging input 802(n). More specifically, the plurality of ground-truth annotations 804(n) can include an annotation 804(n)(1)(1), where the annotation 804(n)(1)(1) can be considered as a ground-truth result that should be outputted by the task-specific head 602(1)(1) if the deep learning neural network 202 were executed on the training medical imaging input 802(n). Likewise, the plurality of ground-truth annotations 804(n) can include an annotation 804(n)(1)(q), where the annotation 804(n)(1)(q) can be considered as a ground-truth result that should be outputted by the task-specific head 602(1)(q) if the deep learning neural network 202 were executed on the training medical imaging input 802(n). Furthermore, the plurality of ground-truth annotations 804(n) can include an annotation 804(n)(p)(1), where the annotation 804(n)(p)(1) can be considered as a ground-truth result that should be outputted by the task-specific head 602(p)(1) if the deep learning neural network 202 were executed on the training medical imaging input 802(n). Further still, the plurality of ground-truth annotations 804(n) can include an annotation 804(n)(p)(q), where the annotation 804(n)(p)(q) can be considered as a ground-truth result that should be outputted by the task-specific head 602(p)(q) if the deep learning neural network 202 were executed on the training medical imaging input 802(n).

In various cases, the annotation 804(n)(1)(1) to the annotation 804(n)(1)(q) can collectively be considered as a subset 804(n)(1) of the plurality of ground-truth annotations 804 (n). Likewise, in various instances, the annotation 804(n) (p)(1) to the annotation 804(n)(p)(q) can collectively be considered as a subset 804(n)(p) of the plurality of ground-truth annotations 804(n).

In various aspects, each annotation of the plurality of ground-truth annotations 804(n) can be crafted manually by technicians based on the training medical imaging input 802(n). In various other aspects, each of the plurality of ground-truth annotations 804(n) can be generated by a respective pre-trained teacher network. In particular, just as above, there can be a total of (p)(q) teacher networks, each being pre-trained to perform a respective one of the total of (p)(q) inferencing tasks on inputted medical images. So, each of such total of (p)(q) teacher networks can be independently executed on the training medical imaging input 802(n), thereby yielding a respective output, and such respective output can be considered or treated as one of the plurality of ground-truth annotations 804(n).

Figure 9:
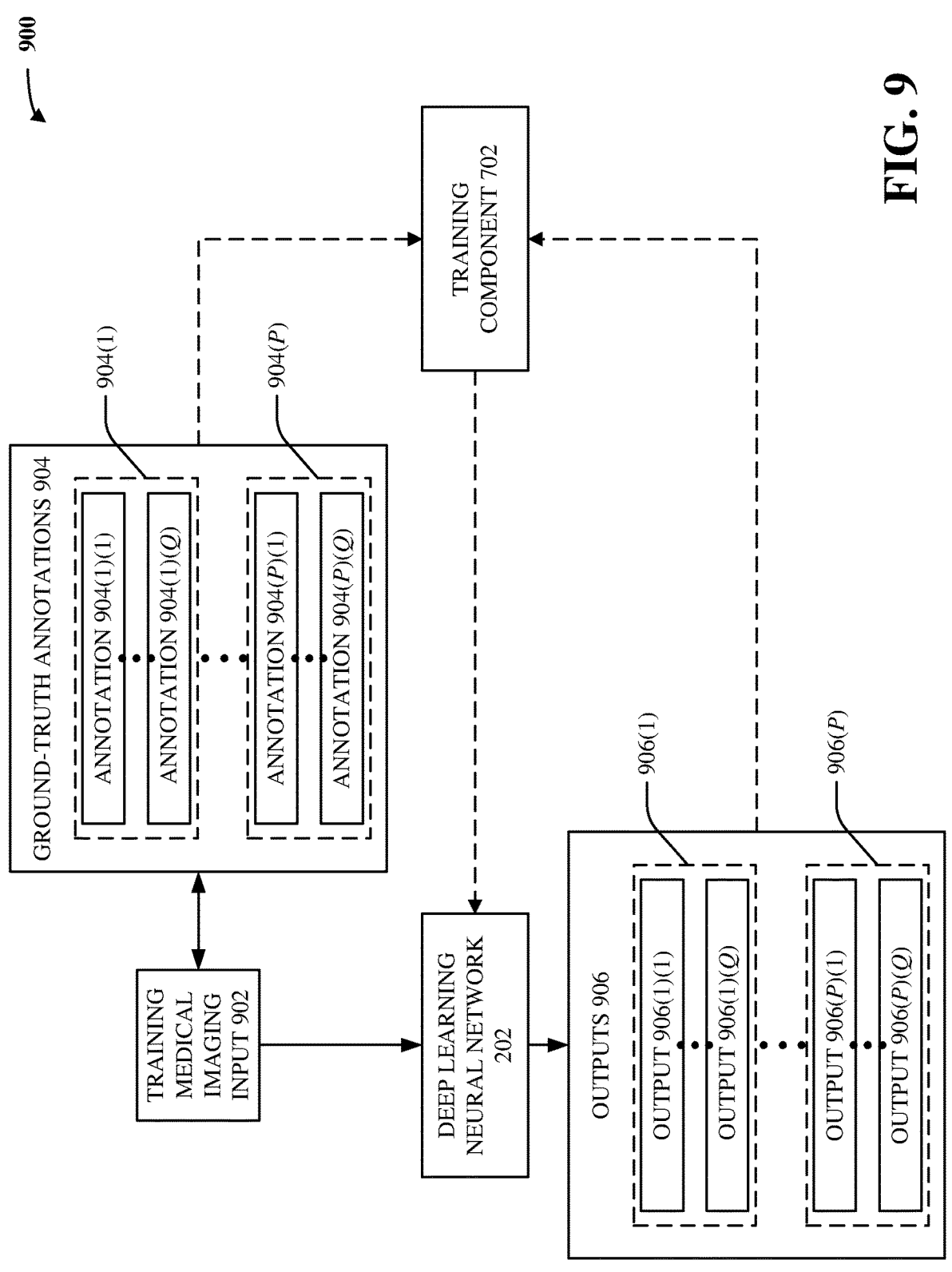
FIG. 9 illustrates an example, non-limiting block diagram showing how a deep learning neural network can be trained in accordance with one or more embodiments described herein.

FIG. 9 illustrates an example, non-limiting block diagram 900 showing how the deep learning neural network 202 can be trained in accordance with one or more embodiments described herein.

In various aspects, the training component 702 can, prior to beginning training, initialize in any suitable fashion (e.g., random initialization) the trainable internal parameters (e.g., convolutional kernels, weight matrices, bias values) of the deep learning neural network 202 (e.g., of the common backbone 402, of the plurality of modality-specific backbones 404, of the plurality of task-specific backbones 406, of the plurality of task-specific heads 602).

In various aspects, the training component 702 can select from the training dataset 704 a training medical imaging input 902 and a plurality of ground-truth annotations 904 corresponding to the training medical imaging input 902. In various instances, as shown, the plurality of ground-truth annotations 904 can include a subset 904(1), where the subset 904(1) can have an annotation 904(1)(1) to an annotation 904(1)(q). As also shown, the plurality of ground-truth annotations 904 can include a subset 904(p), where the subset 904(p) can have an annotation 904(p)(1) to an annotation 904(p)(q).

In various cases, the training component 702 can execute the deep learning neural network 202 on the training medical imaging input 902, thereby causing the deep learning neural network 202 to produce a plurality of outputs 906. More specifically, the training medical imaging input 902 can complete a forward pass through the backbone portion 302, through the concatenation portion 304, and through the head portion 306, and the plurality of task-specific heads 602 can generate the plurality of outputs 906. More specifically still, the task-specific head 602(1)(1) can generate an output 906(1)(1), the task-specific head 602(1)(q) can generate an output 906(1)(q), the task-specific head 602(p)(1) can generate an output 906(p)(1), and the task-specific head 602(p) (q) can generate an output 906(p)(q). In various cases, the output 906(1)(1) to the output 906(1)(q) can collectively be considered as a subset 906(1) of the plurality of outputs 906. Likewise, the output 906(p)(1) to the output 906(p)(q) can collectively be considered as a subset 906(p) of the plurality of outputs 906.

In various aspects, the plurality of outputs 906 can be considered as the predicted or inferred results (e.g., predicted/inferred quality-enhanced images, predicted/inferred denoised images, predicted/inferred kernel-transformed images, predicted/inferred segmentation masks, predicted/inferred classification labels) that the deep learning neural network 202 believes should correspond to the training medical imaging input 902. In contrast, the plurality of ground-truth annotations 904 can be considered as the correct/accurate results (e.g., correct/accurate quality-enhanced images, correct/accurate denoised images, correct/accurate kernel-transformed images, correct/accurate segmentation masks, correct/accurate classification labels) that are known or deemed to correspond to the training medical imaging input 902. Note that, if the deep learning neural network 202 has so far undergone no or little training, then the plurality of outputs 906 can be highly inaccurate (e.g., the output 906(1)(1) can be very different from the annotation 904(1)(1); the output 906(1)($q$) can be very different from the annotation 904(1)($q$); the output 906($p$)(1) can be very different from the annotation 904($p$)(1); or the output 906($p$)($q$) can be very different from the annotation 904($p$)($q$)).

In various aspects, the training component 702 can compute one or more errors or losses (e.g., MAE, MSE, cross-entropy) between the plurality of outputs 906 and the plurality of ground-truth annotations 904. For example, the training component 702 can compute an error or loss between the output 906(1)(1) and the annotation 904(1)(1), can compute an error or loss between the output 906(1)($q$) and the annotation 904(1)($q$), can compute an error or loss between the output 906($p$)(1) and the annotation 904($p$)(1), or can compute an error or loss between the output 906($p$)($q$) and the annotation 904($p$)($q$). In some cases, the training component 702 can aggregate such one or more errors or losses together (e.g., via averaging).

In any case, the training component 702 can update the trainable internal parameters of the deep learning neural network 202 (e.g., of the common backbone 402, of the plurality of modality-specific backbones 404, of the plurality of task-specific backbones 406, of the plurality of task-specific heads 602) via backpropagation (e.g., stochastic gradient descent) that is driven by such one or more errors or losses.

In various instances, the training component 702 can repeat such execution and update procedure for each training medical imaging input in the training dataset 704. This can ultimately cause the trainable internal parameters of the deep learning neural network 202 to become iteratively optimized for accurately performing the plurality of inferencing tasks (e.g., the total of (p)(q) inferencing tasks) on inputted medical imaging data. In various cases, the training component 702 can implement any suitable training batch sizes, any suitable training termination criteria, or any suitable error, loss, or objective functions.

In some aspects, the training component 702 can train the deep learning neural network 202 in a two-phase fashion. In a first phase of such two-phase fashion, the training component 702 can execute the deep learning neural network 202 on selected training medical imaging inputs and can update internal parameters of the deep learning neural network 202 via backpropagation as described above. However, in such first phase, the training component 702 can apply any suitable regularization term (e.g., L1 regularization, L2 regularization) to the plurality of task-specific backbones 406 or to the plurality of task-specific heads 602. Moreover, in such first phase, the training component 702 can refrain from applying regularization terms to the common backbone 402 or to the plurality of modality-specific backbones 404. In various cases, such implementation of regularization can cause the common backbone 402 or the plurality of modality-specific backbones 404 to learn comparatively more than the plurality of task-specific backbones 406 or the plurality of task-specific heads 602. In a second phase of such two-phase fashion, the training component 702 can execute the deep learning neural network 202 on selected training medical imaging inputs and can update internal parameters of the deep learning neural network 202 via backpropagation as described above. However, in such second phase, the training component 702 can refrain from applying regularization terms to the plurality of task-specific backbones 406 or to the plurality of task-specific heads 602. Furthermore, in such second phase, the training component 702 can freeze the internal parameters of the common backbone 402 or of the plurality of modality-specific backbones 404. In various cases, such freezing and lack of regularization can be considered as fine-tuning the plurality of task-specific backbones 406 or the plurality of task-specific heads 602, while leaving the common backbone 402 or the plurality of modality-specific backbones 404 unchanged.

Note that, in various aspects, the herein described internal architecture of the deep learning neural network 202 can be considered as a modular, white-box architecture that can reduce waste of computational resources in situations where retraining or revalidation are desired.

As a non-limiting example, suppose that, after training, the deep learning neural network 202 can perform all but a small minority of its (p)(q) inferencing tasks with sufficient accuracy (e.g., this can occur if governing regulations applicable to that small minority of inferencing tasks are prospectively changed to require heightened accuracy). If the deep learning neural network 202 exhibited a fully-connected, black-box internal architecture, it would not be known which internal parameters of the deep learning neural network 202 are responsible for performing which of the (p)(q) inferencing tasks. Thus, in such case, an entirety of the deep learning neural network 202 would have to undergo retraining in order to increase the accuracy of the deep learning neural network 202 with respect to such small minority of the (p)(q) inferencing tasks. This would be considered as wasting computational resources (e.g., time) on retraining portions of the deep learning neural network 202 that are already able to perform their respective inferencing tasks with sufficient accuracy.

However, the herein described internal architecture of the deep learning neural network 202 can eliminate such need for full retraining. In particular, it can be known which of the plurality of task-specific backbones 406 and which of the plurality of task-specific heads 602 are responsible for performing (e.g., are associated with) that small minority of the (p)(q) inferencing tasks. Thus, in various cases, such responsible task-specific backbones and such responsible task-specific heads can be retrained, while a remainder of the deep learning neural network 202 (e.g., while the common backbone 402, while the plurality of modality-specific backbones 404, while the rest of the task-specific backbones 406, and while the rest of the task-specific heads 602) are frozen or otherwise left unchanged. In this way, computational resources (e.g., time) need not be wasted on retraining portions of the deep learning neural network 202 that are already able to perform their respective inferencing tasks with sufficient accuracy.

As another non-limiting example, suppose that, after training, it is desired to teach the deep learning neural network 202 to perform a new inferencing task. That is, after having trained the deep learning neural network 202 to perform a total of (p)(q) inferencing tasks, it can be desired to configure the deep learning neural network 202 to perform a total of (p)(q)+1 inferencing tasks. If the deep learning neural network 202 exhibited a fully-connected, black-box internal architecture, this would not be possible without enlarging the existing layers of the deep learning neural network 202 and subsequently retraining an entirety of the deep learning neural network 202. Just as above, this would be considered as wasting computational resources (e.g., time) on retraining the deep learning neural network 202 to perform inferencing tasks (e.g., the original (p)(q) inferencing tasks) that it can already perform with sufficient accuracy.

However, the herein described internal architecture of the deep learning neural network 202 can eliminate such need for full retraining. In particular, a new task-specific backbone can be inserted into the plurality of task-specific backbones 406, a new concatenation layer can be inserted into the plurality of concatenation layers 502 such that it is in series with the new task-specific backbone, and a new task-specific head can be inserted into the plurality of task-specific heads 602 such that it is in series with the new concatenation layer. Furthermore, new ground-truth annotations that correspond to the new, desired inferencing task can be obtained (e.g., manually or via a new pre-trained teacher network). Accordingly, the new task-specific backbone and the new task-specific head can be trained using such new ground-truth annotations, and a remainder of the deep learning neural network 202 (e.g., the common backbone 402, the plurality of modality-specific backbones 404, the rest of the plurality of task-specific backbones 406, the rest of the plurality of task-specific heads 602) can be frozen or otherwise left unchanged. In this way, computational resources (e.g., time) need not be wasted on retraining the deep learning neural network 202 to perform tasks that it can already perform with sufficient accuracy.

As yet another non-limiting example, suppose that, after training, it is desired to prevent the deep learning neural network 202 from performing one of its (p)(q) inferencing tasks. That is, after having trained the deep learning neural network 202 to perform a total of (p)(q) inferencing tasks, it can be desired to configure the deep learning neural network 202 to perform a total of (p)(q)−1 inferencing tasks. If the deep learning neural network 202 exhibited a fully-connected, black-box internal architecture, this would not be possible without shrinking the existing layers of the deep learning neural network 202 and subsequently retraining an entirety of the deep learning neural network 202. Just as above, this would be considered as wasting computational resources.

However, the herein described internal architecture of the deep learning neural network 202 can eliminate such need for full retraining. More specifically, the particular one of the (p)(q) inferencing tasks that is desired to be removed can correspond to a particular one of the plurality of task-specific backbones 406, and such particular task-specific backbone can be deleted, removed, or otherwise deactivated. Furthermore, the particular one of the (p)(q) inferencing tasks that is desired to be removed can correspond to a particular one of the plurality of concatenation layers 502, and such particular concatenation layer can be deleted, removed, or otherwise deactivated. Further still, the particular one of the (p)(q) inferencing tasks that is desired to be removed can correspond to a particular one of the plurality of task-specific heads 602, and such particular task-specific head can be deleted, removed, or otherwise deactivated. In various aspects, such deletions, removals, or deactivations can cause the deep learning neural network 202 to no longer perform the particular inferencing task. However, such deletions, removals, or deactivations can have no effect on other portions of the deep learning neural network 202 (e.g., can have no effect on the common backbone 402, on the plurality of modality-specific backbones 404, on the remainder of the plurality of task-specific backbones 406, on the remainder of the plurality of concatenation layers 502, or on the remainder of the plurality of task-specific heads 602). In this way, inferencing tasks can be selectively removed from the repertoire of the deep learning neural network 202 without affecting how the deep learning neural network 202 performs other inferencing tasks.

FIGS. 10-14 illustrate flow diagrams of example, non-limiting computer-implemented methods 1000, 1100, 1200, 1300, and 1400 for training a deep learning neural network in accordance with one or more embodiments described herein. In various cases, the image analysis system 102 can facilitate the computer-implemented methods 1000, 1100, 1200, 1300, and 1400.

First, consider FIG. 10. In various embodiments, act 1002 can include accessing, by a device (e.g., via 110) operatively coupled to a processor (e.g., 106), a deep learning neural network (e.g., 202). In various aspects, the deep learning neural network can include a common backbone (e.g., 402). In various instances, the deep learning neural network can include a plurality of modality-specific backbones (e.g., 404) in parallel with the common backbone. In various cases, the deep learning neural network can include a plurality of task-specific backbones (e.g., 406) in parallel with the common backbone. In various aspects, the deep learning neural network can include a plurality of concatenation layers (e.g., 502) respectively in series with the plurality of task-specific backbones. In various instances, the deep learning neural network can include a plurality of task-specific heads respectively in series with the plurality of concatenation layers. In various cases, respective subsets of the plurality of task-specific backbones can correspond to respective ones of the plurality of modality-specific backbones (e.g., 406(1) can correspond to 404(1)). In various aspects, each concatenation layer can receive input from a respective task-specific backbone, from a modality-specific backbone that corresponds to that respective task-specific backbone, and from the common backbone (e.g., 502(1)(1) can receive input from 406(1)(1), from 404(1), and from 402). In various instances, each task-specific head can receive input from a corresponding concatenation layer (e.g., 602(1)(1) can receive input from 502(1)(1)).

In various cases, act 1004 can include accessing, by the device (e.g., via 110), a training dataset (e.g., 704) on which to train the deep learning neural network. In various aspects, the training dataset can include a set of training inputs (e.g., 802) and a corresponding set of pluralities of ground-truth annotations (e.g., 804). In various instances, each ground-truth annotation can be generated or otherwise obtained from a respective teacher network.

In various cases, act 1006 can include randomly initializing, by the device (e.g., via 702), trainable internal parameters (e.g., convolutional kernels, weight matrices, bias values) of the deep learning neural network.

In various aspects, act 1008 can include determining, by the device (e.g., via 702), whether any training input in the training dataset has not yet been used to train the deep learning neural network. If so (e.g., if there is at least one training input that has not yet been used to train the deep learning neural network), the computer-implemented method 1000 can proceed to act 1102 of the computer-implemented method 1100. In not (e.g., if every training input has already been used to train the deep learning neural network), the computer-implemented method 1000 can proceed to act 1202 of the computer-implemented method 1200.

Now, consider FIG. 11. In various embodiments, act 1102 can include selecting, by the device (e.g., via 702) and from the training dataset, a training input (e.g., 902) that has not yet been used to train the deep learning neural network and a corresponding plurality of ground-truth annotations (e.g., 904).

In various aspects, act 1104 can include executing, by the device (e.g., via 702), the deep learning neural network on the training input, thereby causing the deep learning neural network to produce a plurality of inferencing outputs (e.g., 906).

In various instances, act 1106 can include computing, by the device (e.g., via 702), at least one loss between the plurality of inferencing outputs and the selected plurality of ground-truth annotations. In various cases, the at least one loss can include a regularization term applied to the plurality of task-specific backbones, but not applied to the common backbone.

In various aspects, act 1108 can include updating, by the device (e.g., via 702) and via backpropagation driven by the at least one loss, trainable internal parameters of the common backbone, of the plurality of modality-specific backbones, of the plurality of task-specific backbones, and of the plurality of task-specific heads.

In various instances, the computer-implemented method 1100 can proceed back to act 1008.

Note that acts 1008-1108 can iterate until every training input has been used to train the deep learning neural network. This can be considered as a first phase of training.

Figure 12:
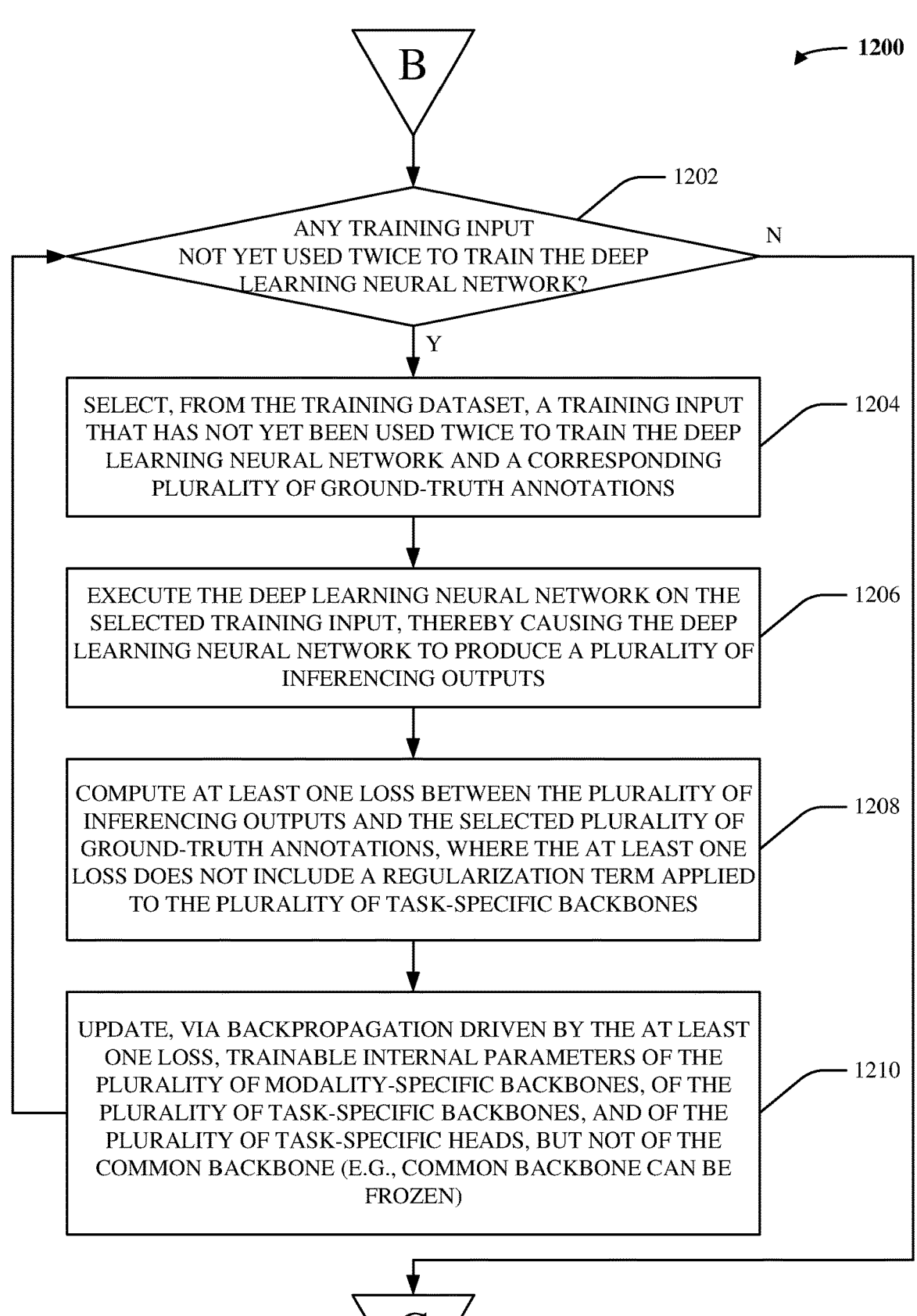

Now, consider FIG. 12. In various embodiments, act 1202 can include determining, by the device (e.g., via 702), whether any training input in the training dataset has not yet been used twice to train the deep learning neural network. If so (e.g., if there is at least one training input that has not yet been used twice to train the deep learning neural network), the computer-implemented method 1200 can proceed to act 1204. In not (e.g., if every training input has already been used twice to train the deep learning neural network), the computer-implemented method 1200 can proceed to act 1302 of the computer-implemented method 1300.

In various aspects, act 1204 can include selecting, by the device (e.g., via 702) and from the training dataset, a training input (e.g., 902) that has not yet been used twice to train the deep learning neural network and a corresponding plurality of ground-truth annotations (e.g., 904).

In various aspects, act 1206 can include executing, by the device (e.g., via 702), the deep learning neural network on the training input, thereby causing the deep learning neural network to produce a plurality of inferencing outputs (e.g., 906).

In various instances, act 1208 can include computing, by the device (e.g., via 702), at least one loss between the plurality of inferencing outputs and the selected plurality of ground-truth annotations. In various cases, the at least one loss can lack regularization terms applied to the plurality of task-specific backbones. Contrast this with the at least one loss computed at act 1106.

In various aspects, act 1210 can include updating, by the device (e.g., via 702) and via backpropagation driven by the at least one loss, trainable internal parameters of the plurality of modality-specific backbones, of the plurality of task-specific backbones, and of the plurality of task-specific heads, but not of the common backbone. In other words, the common backbone can be considered as being frozen. In some cases, the plurality of modality-specific backbones can be frozen during this act, as well.

In various instances, the computer-implemented method 1200 can proceed back to act 1202.

Note that acts 1202-1210 can iterate until every training input has been used twice to train the deep learning neural network. This can be considered as a second phase of training.

Now, consider FIG. 13. In various embodiments, act 1302 can include determining, by the device (e.g., via 702), whether a new inferencing task capability is desired. If not (e.g., if it is not desired to teach the deep learning neural network how to perform a new inferencing task), then the computer-implemented method 1300 can end at act 1304. If so (e.g., if it is desired to teach the deep learning neural network how to perform a new inferencing task), then the computer-implemented method 1300 can proceed to act 1306.

In various aspects, act 1306 can include: inserting, by the device (e.g., via 702) and into the plurality of task-specific backbones, a new task-specific backbone corresponding to the new inferencing task capability; inserting, by the device (e.g., via 702) and into the plurality of concatenation layers, a new concatenation layer in series with the new task-specific backbone; and inserting, by the device (e.g., via 702) and into the plurality of task-specific heads, a new task-specific head in series with the new concatenation layer. In various instances, the new task-specific backbone can correspond to one of the plurality of modality-specific backbones. In various cases, the new concatenation layer can receive input from the new task-specific backbone, from whichever modality-specific backbone corresponds to the new task-specific backbone, and from the common backbone. In various aspects, the new task-specific head can receive input from the new concatenation layer.

In various instances, act 1308 can include inserting, by the device (e.g., 702) and into each plurality of ground-truth annotations in the training dataset, a new ground-truth annotation corresponding to the new inferencing task capability. In some cases, these new ground-truth annotations can be generated by a new teacher network that has been already trained to perform the new inferencing task capability.

In various aspects, act 1310 can include randomly initializing, by the device (e.g., via 702), trainable internal parameters of the new task-specific backbone and of the new task-specific head, while leaving all other trainable parameters of the deep learning network unchanged (e.g., while freezing the common backbone, the plurality of modality-specific backbones, the rest of the plurality of task-specific backbones, and the rest of the plurality of task-specific heads). As shown, the computer-implemented method 1300 can proceed to act 1402 of the computer-implemented method 1400.

Now, consider FIG. 14. In various embodiments, act 1402 can include determining, by the device (e.g., via 702), whether any training input in the training dataset has not yet been used to train the new task-specific backbone and the new task-specific head (e.g., inserted at act 1306). If not (e.g., if all of the training inputs have already been used to train the new task-specific backbone and the new task-specific head inserted at act 1306), then the computer-implemented method 1400 can proceed back to act 1302. If so (e.g., if there is at least one training input that has not yet been used to training the new-task specific backbone and the new task-specific head inserted at act 1306), then the computer-implemented method 1400 can proceed to act 1404.

In various aspects, act 1404 can include selecting, by the device (e.g., via 702) and from the training dataset, a training input (e.g., 902) that has not yet been used to train the new task-specific backbone and the new task-specific head, and selecting, by the device (e.g., via 702) and from the training dataset, a corresponding plurality of ground-truth annotations (e.g., 904). Note that the selected plurality of ground-truth annotations can, at this point, have a new ground-truth annotation corresponding to the new inferencing task capability (e.g., due to act 1308).

In various instances, act 1406 can include executing, by the device (e.g., via 702), the deep learning neural network on the selected training input, thereby causing the deep learning neural network to produce a plurality of inferencing outputs (e.g., 906).

In various cases, act 1408 can include computing, by the device (e.g., via 702), at least one loss between the plurality of inferencing outputs and the selected plurality of ground-truth annotations. In various aspects, the at least one loss can have no regularization terms applied to the new task-specific backbone.

In various instances, act 1410 can include updating, by the device (e.g., via 702) and via backpropagation driven by the at least one loss, trainable internal parameters of the new task-specific backbone and of the new task-specific head, but not of any other portions of the deep learning neural network. In other words, the rest of the deep learning neural network can be frozen.

In various cases, the computer-implemented method 1400 can proceed back to act 1402.

The present inventors experimentally validated various embodiments described herein. In particular, an example, non-limiting embodiment of the deep learning neural network 202 was created, where such deep learning neural network was trained to perform a tissue segmentation task, a combined pneumothorax segmentation and classification task, and a combined COVID segmentation and classification task on inputted X-ray images depicting patient chest cavities. Accordingly, such deep learning neural network had a common backbone, three task-specific backbones (e.g., one per task), three concatenation layers (e.g., one per task), and three task-specific heads (e.g., one per task). Because the non-limiting deep learning neural network focused only on an X-ray imaging modality, no modality-specific backbones were included. Such deep learning neural network was trained on a training dataset whose ground-truth annotations were generated by a pre-trained tissue segmentation teacher network, a pre-trained pneumothorax segmentation and classification teacher network, and a pre-trained COVID segmentation and classification teacher network. Such deep learning neural network was trained in the two-phase fashion described above, and the performance of such deep learning neural network was compared to those of the three teacher networks.

The deep learning neural network consumed less total computer memory (e.g., had fewer total internal parameters) than the sum of the three teacher networks. In other words, the deep learning neural network could perform the same three tasks as the three teacher networks, notwithstanding having a smaller footprint (e.g., notwithstanding taking up less space) than the three teacher networks. Moreover, despite such smaller footprint, the deep learning neural network exhibited comparable performance as the three teacher networks. Specifically, with respect to pneumothorax segmentation and classification, the appropriate teacher network exhibited an accuracy score of 0.85, an area under curve (AUC) of 0.94, and Dice's score of 0.72, whereas the deep learning neural network exhibited an accuracy score of 0.86, an AUC of 0.93, and a Dice's score of 0.66. Moreover, with respect to COVID classification and segmentation, the appropriate teacher network exhibited AUC's of 0.91, 0.98, and 0.98 for the different classification cases, a Covid-specific Dice's score of 0.59, and a pneumonia-specific Dice's score of 0.54, whereas the deep learning neural network exhibited 0.94, 0.98, 0.98, 0.57, and 0.53 respectively. Furthermore, with respect to tissue segmentation, the appropriate teacher network exhibited Dice's scores of 0.717, 0.617, and 0.767 on different tissue types, whereas the deep learning neural network exhibited 0.701, 0.622, and 0.776 respectively. As these experimental results demonstrate, the deep learning neural network was able to achieve comparable accuracy as the three teacher networks, while taking up less space (e.g., while having fewer internal parameters) than the three teacher networks combined.

FIG. 15 illustrates a flow diagram of an example, non-limiting computer-implemented method 1500 that can facilitate deep learning image analysis with increased modularity and reduced footprint in accordance with one or more embodiments described herein. In various cases, the image analysis system 102 can facilitate the computer-implemented method 1500.

In various embodiments, act 1502 can include accessing, by a device (e.g., via 110) operatively coupled to a processor (e.g., 106), medical imaging data (e.g., 104).

In various aspects, act 1504 can include performing, by the device (e.g., via 112) and via execution of a deep learning neural network (e.g., 202), a plurality of inferencing tasks on the medical imaging data, wherein the deep learning neural network can comprise a common backbone (e.g., 402) in parallel with a plurality of task-specific backbones (e.g., 406), and wherein the plurality of task-specific backbones can respectively correspond to the plurality of inferencing tasks.

Although not explicitly shown in FIG. 15, the deep learning neural network further can comprise a plurality of modality-specific backbones (e.g., 404) in parallel with the common backbone and in parallel with the plurality of task-specific backbones, wherein respective ones of the plurality of modality-specific backbones can correspond to respective subsets of the plurality of task-specific backbones (e.g., 404($p$) can correspond to 406($p$)).

Although not explicitly shown in FIG. 15, the deep learning neural network can further comprise a plurality of combination layers (e.g., 502) respectively in series with the plurality of task-specific backbones. In various aspects, the common backbone can receive the medical imaging data as input and can produce a first intermediate output (e.g., 408), the plurality of modality-specific backbones can receive the medical imaging data as input and can produce a plurality of second intermediate outputs (e.g., 410), and the plurality of task-specific backbones can receive the medical imaging data as input and can produce a plurality of third intermediate outputs (e.g., 412). In various instances, the plurality of combination layers can combine (e.g., in some cases, concatenate) respective ones of the plurality of third intermediate outputs with the first intermediate output and with respective ones of the plurality of second intermediate outputs (e.g., 502($p$)(1) can combine 412($p$)(1) with 410($p$) and with 408), thereby yielding a plurality of combinations (e.g., 504).

Although not explicitly shown in FIG. 15, the deep learning neural network can further comprise a plurality of task-specific heads (e.g., 602) respectively in series with the plurality of combination layers. In various cases, the plurality of task-specific heads can receive the plurality of combinations as input and can produce a plurality of inferencing outputs (e.g., 204) that respectively correspond to the plurality of inferencing tasks.

Although not explicitly shown in FIG. 15, the computer-implemented method 1500 can further comprise rendering, by the device (e.g., via 114), at least one of the plurality of inferencing outputs on a graphical user-interface.

Although not explicitly shown in FIG. 15, the deep learning neural network can be trained via a first phase and a second phase, wherein the first phase can include training the common backbone and the plurality of task-specific backbones based on a regularization term applied to the plurality of task-specific backbones, and wherein the second phase can include freezing the common backbone and removing the regularization term. In various instances, the training the deep learning neural network can occur in supervised fashion based on ground-truth annotations (e.g., 804) generated by a plurality of teacher networks. In various cases, a new task-specific backbone can be added to the plurality of task-specific backbones, and the new task-specific backbone can be trained while the common backbone and a remainder of the plurality of task-specific backbones can be frozen.

Various embodiments described herein can be considered as a computerized tool for facilitating deep learning image analysis with increased modularity and reduced footprint. A deep learning neural network having an internal architecture as described herein can perform multiple inferencing tasks with comparable accuracy as multiple teacher networks, yet such deep learning neural network can consume fewer computational resources as compared to such multiple teacher networks. Furthermore, discrete portions of the deep learning neural network can be selectively retrained or revalidated, without affecting other portions of the deep learning neural network. Such reduced consumption of computational resources and such improved modularity/transparency are certainly concrete and tangible technical benefits. Accordingly, various embodiments described herein surely constitute useful and practical applications of computers.

Although the herein disclosure mainly describes various embodiments as applying to medical imaging data, this is a mere non-limiting example. In various aspects, the herein-described teachings can be extrapolated to any suitable types of electronic imaging data (e.g., can be not limited only to imaging data in the medical/clinical context).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 16:
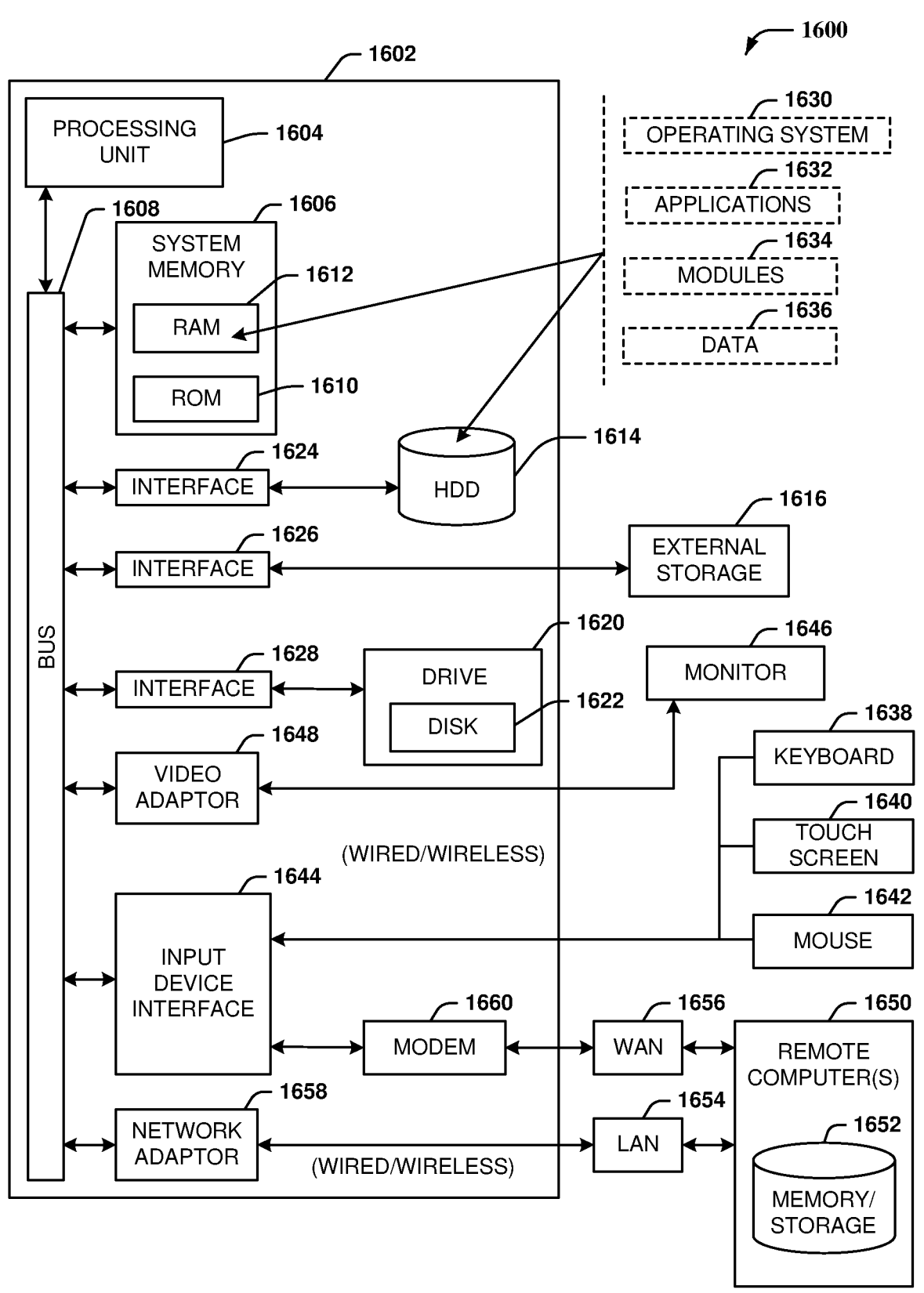
FIG. 16 illustrates a block diagram of an example, non-limiting operating environment in which one or more embodiments described herein can be facilitated.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and a drive 1620, e.g., such as a solid state drive, an optical disk drive, which can read or write from a disk 1622, such as a CD-ROM disc, a DVD, a BD, etc. Alternatively, where a solid state drive is involved, disk 1622 would not be included, unless separate. While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and drive 1620 can be connected to the system bus 1608 by an HDD interface 1624, an external storage interface 1626 and a drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enable with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/ wireless connectivity to a local area network (LAN) 1654 or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/ storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above, such as but not limited to a network virtual machine providing one or more aspects of storage or processing of information. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 17 is a schematic block diagram of a sample computing environment 1700 with which the disclosed subject matter can interact. The sample computing environment 1700 includes one or more client(s) 1710. The client(s) 1710 can be hardware or software (e.g., threads, processes, computing devices). The sample computing environment 1700 also includes one or more server(s) 1730. The server(s) 1730 can also be hardware or software (e.g., threads, processes, computing devices). The servers 1730 can house threads to perform transformations by employing one or more embodiments as described herein, for example. One possible communication between a client 1710 and a server 1730 can be in the form of a data packet adapted to be transmitted between two or more computer processes. The sample computing environment 1700 includes a communication framework 1750 that can be employed to facilitate communications between the client(s) 1710 and the server(s) 1730.

The client(s) 1710 are operably connected to one or more client data store(s) 1720 that can be employed to store information local to the client(s) 1710. Similarly, the server(s) 1730 are operably connected to one or more server data store(s) 1740 that can be employed to store information local to the servers 1730.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a non-transitory computer-readable memory, the computer-executable components comprising:
an access component that accesses medical imaging data; and
an inference component that performs, via execution of a deep learning neural network, a plurality of inferencing tasks on the medical imaging data, wherein the deep learning neural network comprises a common backbone in parallel with a plurality of task-specific backbones, and wherein the plurality of task-specific backbones respectively correspond to the plurality of inferencing tasks.

2. The system of claim 1, wherein the deep learning neural network further comprises a plurality of modality-specific backbones in parallel with the common backbone and in parallel with the plurality of task-specific backbones, wherein respective ones of the plurality of modality-specific backbones correspond to respective subsets of the plurality of task-specific backbones.

3. The system of claim 2, wherein the deep learning neural network further comprises a plurality of combination layers respectively in series with the plurality of task-specific backbones, wherein the common backbone receives the medical imaging data as input and produces a first intermediate output, wherein the plurality of modality-specific backbones receive the medical imaging data as input and produce a plurality of second intermediate outputs, wherein the plurality of task-specific backbones receive the medical imaging data as input and produce a plurality of third intermediate outputs, and wherein the plurality of combination layers combine respective ones of the plurality of third intermediate outputs with the first intermediate output and with respective ones of the plurality of second intermediate outputs, thereby yielding a plurality of combinations.

4. The system of claim 3, wherein the deep learning neural network further comprises a plurality of task-specific heads respectively in series with the plurality of combination layers, wherein the plurality of task-specific heads receive the plurality of combinations as input and produce a plurality of inferencing outputs that respectively correspond to the plurality of inferencing tasks.

5. The system of claim 4, wherein the computer-executable components further comprise:
a result component that renders at least one of the plurality of inferencing outputs on a graphical user-interface.

6. The system of claim 1, wherein the deep learning neural network is trained via a first phase and a second phase, wherein the first phase includes training the common backbone and the plurality of task-specific backbones based on a regularization term applied to the plurality of task-specific backbones, and wherein the second phase includes freezing the common backbone and removing the regularization term.

7. The system of claim 6, wherein the deep learning neural network is trained in supervised fashion based on ground-truth annotations generated by a plurality of teacher networks.

8. The system of claim 6, wherein a new task-specific backbone is added to the plurality of task-specific backbones, wherein the new task-specific backbone is trained while the common backbone and a remainder of the plurality of task-specific backbones are frozen.

9. A computer-implemented method, comprising:
accessing, by a device operatively coupled to a processor, medical imaging data; and
performing, by the device and via execution of a deep learning neural network, a plurality of inferencing tasks on the medical imaging data, wherein the deep learning neural network comprises a common backbone in parallel with a plurality of task-specific backbones, and wherein the plurality of task-specific backbones respectively correspond to the plurality of inferencing tasks.

10. The computer-implemented method of claim 9, wherein the deep learning neural network further comprises a plurality of modality-specific backbones in parallel with the common backbone and in parallel with the plurality of task-specific backbones, wherein respective ones of the plurality of modality-specific backbones correspond to respective subsets of the plurality of task-specific backbones.

11. The computer-implemented method of claim 10, wherein the deep learning neural network further comprises a plurality of combination layers respectively in series with the plurality of task-specific backbones, wherein the common backbone receives the medical imaging data as input and produces a first intermediate output, wherein the plurality of modality-specific backbones receive the medical imaging data as input and produce a plurality of second intermediate outputs, wherein the plurality of task-specific backbones receive the medical imaging data as input and produce a plurality of third intermediate outputs, and wherein the plurality of combination layers combine respective ones of the plurality of third intermediate outputs with the first intermediate output and with respective ones of the plurality of second intermediate outputs, thereby yielding a plurality of combinations.

12. The computer-implemented method of claim 11, wherein the deep learning neural network further comprises a plurality of task-specific heads respectively in series with the plurality of combination layers, wherein the plurality of task-specific heads receive the plurality of combinations as input and produce a plurality of inferencing outputs that respectively correspond to the plurality of inferencing tasks.

13. The computer-implemented method of claim 12, further comprising:
rendering, by the device, at least one of the plurality of inferencing outputs on a graphical user-interface.

14. The computer-implemented method of claim 9, wherein the deep learning neural network is trained via a first phase and a second phase, wherein the first phase includes training the common backbone and the plurality of task-specific backbones based on a regularization term applied to the plurality of task-specific backbones, and wherein the second phase includes freezing the common backbone and removing the regularization term.

15. The computer-implemented method of claim 14, wherein the deep learning neural network is trained in supervised fashion based on ground-truth annotations generated by a plurality of teacher networks.

16. The computer-implemented method of claim 14, wherein a new task-specific backbone is added to the plurality of task-specific backbones, wherein the new task-specific backbone is trained while the common backbone and a remainder of the plurality of task-specific backbones are frozen.

17. A computer program product for facilitating deep learning image analysis with increased modularity and reduced footprint, the computer program product comprising a non-transitory computer-readable memory having program instructions embodied therewith, the program instructions executable by a processor associated with one or more medical imaging devices to cause the processor to:

access medical imaging data generated by the one or more medical imaging devices;

generate, via execution of a deep learning neural network on the medical imaging data, a plurality of inferencing task results, wherein the deep learning neural network comprises a backbone portion, a concatenation portion, and a head portion, wherein:

the backbone portion comprises a plurality of task-specific backbones that are in parallel with each other and with a common backbone, wherein there is one-to-one correspondence between the plurality of inferencing task results and the plurality of task-specific backbones, wherein the plurality of task-specific backbones are isolated from each other and from the common backbone, wherein the common backbone receives the medical imaging data as input and produces a first feature as output, and wherein each of the plurality of task-specific backbones receives as input at least some of the medical imaging data and produces a respective second feature as output, thereby yielding a plurality of second features;

the concatenation portion comprises a plurality of concatenation layers that are in parallel with each other, wherein each of the plurality of concatenation layers is serially downstream of a respective one of the plurality of task-specific backbones, wherein the plurality of concatenation layers are isolated from each other, and wherein each of the plurality of concatenation layers receives as input the first feature and a respective one of the plurality of second features and produces as output a concatenation thereof, thereby yielding a plurality of concatenations; and the head portion comprises a plurality of task-specific heads that are in parallel with each other, wherein each of the plurality of task-specific heads is serially downstream of a respective one of the plurality of concatenation layers, wherein the plurality of task-specific heads are isolated from each other, and wherein each of the plurality of task-specific heads receives as input a respective one of the concatenations and produces as output a respective one of the plurality of inferencing task results; and render at least one of the plurality of inferencing task results on an electronic display of the one or more medical imaging devices.

18. The computer program product of claim 17, wherein the backbone portion further comprises a plurality of modality-specific backbones in parallel with each other, in parallel with the common backbone, and in parallel with the plurality of task-specific backbones, wherein respective ones of the plurality of modality-specific backbones correspond to respective subsets of the plurality of task-specific backbones, and wherein the plurality of modality-specific backbones are isolated from each other, from the common backbone, and from the plurality of task-specific backbones.

19. The computer program product of claim 18, wherein each of the plurality of modality-specific backbones receives as input at least some of the medical imaging data and produces a respective third feature as output, thereby yielding a plurality of third features, and wherein each of the plurality of concatenation layers receives as input a respective one of the plurality of third features.

20. The computer program product of claim 19, wherein each of the plurality of modality-specific backbones contains more internal parameters or layers than each subset of task-specific backbones to which it corresponds, and wherein the common backbone contains more internal parameters or layers than each of the plurality of modality-specific backbones.

* * * * *